US 006598058B2

(12) United States Patent
Bird et al.

(10) Patent No.: US 6,598,058 B2
(45) Date of Patent: Jul. 22, 2003

(54) METHOD AND APPARATUS FOR CROSS-NODE SHARING OF CACHED DYNAMIC SQL IN A MULTIPLE RELATIONAL DATABASE MANAGEMENT SYSTEM ENVIRONMENT

(75) Inventors: Paul Miller Bird, Toronto (CA); Michael Joshua Snowbell, Thornhill (CA)

(73) Assignee: International Business Machines Corporation, Armonk, NY (US)

(*) Notice: Subject to any disclaimer, the term of this patent is extended or adjusted under 35 U.S.C. 154(b) by 1 day.

(21) Appl. No.: 09/404,438

(22) Filed: Sep. 22, 1999

(65) Prior Publication Data

US 2002/0123978 A1 Sep. 5, 2002

(51) Int. Cl.[7] .............................................. G06F 17/30
(52) U.S. Cl. ........................ 707/201; 707/202; 707/203; 707/204; 707/205; 707/1; 707/103
(58) Field of Search ...................... 707/1, 103, 200–205

(56) References Cited

U.S. PATENT DOCUMENTS

| 4,924,384 | A |  | 5/1990 | Hao et al. |
| 5,280,612 | A |  | 1/1994 | Lorie et al. |
| 5,363,505 | A |  | 11/1994 | Maslak et al. |
| 5,423,037 | A |  | 6/1995 | Hvasshovd |
| 5,457,797 | A |  | 10/1995 | Butterworth et al. |
| 5,471,622 | A |  | 11/1995 | Eadline |
| 5,555,404 | A |  | 9/1996 | Torbjornsen et al. |
| 5,806,059 | A |  | 9/1998 | Tsuchida et al. |
| 5,930,795 | A |  | 7/1999 | Chen et al. |
| 6,148,334 | A | * | 11/2000 | Imai et al. ................... 709/219 |
| 6,289,334 | B1 | * | 9/2001 | Reiner et al. ................... 707/3 |

FOREIGN PATENT DOCUMENTS

JP     10-021126    1/1998

OTHER PUBLICATIONS

WB Teeuw, et al., "Control Versus Data Flow in Parallel Database Machines," IEEE Transactions on Parallel and Distributed Systems, vol. 4, No. 11, pp. 1265–1279, Nov. 1993.

IBM Technical Disclosure Bulletin, "Management of Cached Dynamic SQL Integrity in a Multiple Node RDBMS," Software Patent Institute Database of Software Technologies, Record Display, Record 2, Ser. No. TDB1298.0036, pp. 1–3, Dec. 1998.

* cited by examiner

Primary Examiner—Jean M. Corrielus
Assistant Examiner—Cam Truong
(74) Attorney, Agent, or Firm—Sughrue Mion, PLLC

(57) ABSTRACT

The invention provides a data processing system, a method, computer program product and software for operating it where the data processing system includes a number of interconnected nodes. At least one data partition resides on one of the nodes, and one or more tables reside in a data partition. One of the nodes has a catalogue containing metadata describing tables and other objects and relationships therebetween in the data processing system. There is a global instruction cache at each node having a statement portion storing instruction statements and associated executables; each of the executable is designed for a particular environment; the instruction cache includes a dependency portion which lists objects and links them to the corresponding executable entries that depend on the objects; the instruction cache includes a shipped variation portion, each entry of the shipped variation portion refers to one executable entry and identifies the node from which the statement associated with the executable was originally shipped and the identification of such executable in the node from which it was originally shipped. The cache includes an invalidations in progress portion, each entry of the invalidations in progress portion refers to an object entry in the dependency portion.

27 Claims, 13 Drawing Sheets

DYNAMIC SQL CACHE

THE ARROWS INDICATE INTERACTION BETWEEN THE
VARIOUS PARTS OF THE CACHE

DYNAMIC SQL CACHE - INVALIDATIONS IN PROGRESS PORTION

Cont'd (I)

METHOD AND APPARATUS FOR CROSS-NODE SHARING OF CACHED DYNAMIC SQL IN A MULTIPLE RELATIONAL DATABASE MANAGEMENT SYSTEM ENVIRONMENT

FIELD OF THE INVENTION

This invention relates to database management systems, and has particular application to relational database management systems (RDBMS) and more particularly to a method and apparatus for efficiently sharing of instructions, especially cached dynamic SQL statements between applications connected at different nodes in a multiple node database while maintaining cache and application integrity across the nodes.

BACKGROUND OF THE INVENTION

Structured Query Language (SQL) is the database access language most commonly used to access relational databases (such as the DB2 product sold by IBM Corporation) in an open, heterogeneous environment. Although this disclosure refers to the DB2 relational database product sold by IBM, individuals skilled in the art will recognize that the caching of database access statements is applicable to any relational database management system (RDBMS).

Within this specification including the claims, the following terms will be used:

| | |
|---|---|
| Access Plan | An access plan is the method(s) chosen by the SQL Compiler to satisfy an application request as stated in the form of an SQL statement. |
| Agent | A process used by a RDBMS to provide services for an application request. |
| Node | A node is a physical entity (eg. a processor and memory) that is used to process application requests to the RDBMS and contains some or all of the database. A serial version of the RDBMS contains at most 1 node, while a parallel version of the RDBMS can contain 1 or more nodes. |
| Section | A section contains all the information required by the RDBMS to execute the chosen access plan for an SQL statement. A section is the compiled version of the access plan chosen by the SQL compiler. |
| Coordinator node: | The coordinator node refers to the node at which an application issues SQL queries to the database. |
| Subordinate node: | Subordinate nodes are all the nodes, aside from the coordinator node, on which processing of a given SQL request must be run. |
| Catalogue node: | The catalogue node is the single node in the database system which contains the system catalogues. These catalogues contain meta-data about each of the table and SQL objects in the system and the relationships between them. |

There are two basic types of SQL statements, static and dynamic. In using static SQL the user embeds SQL requests for data in an application program. An SQL precompiler removes these statements from the application program and replaces them with function calls whose parameters indicate a specific section entry for the package corresponding to the current source file. The removed SQL statement is then sent to the database management system for compilation. Compiling (also known as preparing) a SQL statement is the process by which the database management system SQL compiler chooses and builds an access plan to efficiently resolve the SQL statement. The access plan is saved in its executable format, a section, in the system catalogues.

The parsing of the statement and building of the access plan can be relatively long and complicated. Compilation of static SQL improves run time performance by building the access plan before the application is executed.

Dynamic SQL is SQL issued by an application that is not compiled until the time the application issues the query, and is often used for ad hoc SQL requests. For example, in a database used to track sales of individual products, a dynamic SQL query may be invoked to list the top ten products sold, by sales region. Depending upon the nature of a dynamic SQL request, the time required to parse it and create an access plan to satisfy the user request can be significant. Furthermore, if the dynamic SQL request is repeated later in the application by the same agent or perhaps by a different agent, a new access plan must be created in each instance. Thus, the creation of an identical access plan may often have to be repeated, thereby impacting performance of the application.

In such a scenario, each of the nodes involved in processing the query must have a copy of the "section" in order that the query runs completely. Including all the data from all the nodes. As a basic solution to this requirement, the dynamic SQL statement is compiled at the node where the application is running. The resulting section is then sent or "shipped" to the remote nodes. At each of the nodes "agents" on behalf of the application can then execute the query using the shipped section. Similarly, applications that are running on other nodes of the database that issue dynamic SQL, require the SQL to be compiled on the resulting section be shipped to all of this remote nodes that are involved in the transaction.

Given the potentially high cost of compilation and of SQL sections, it is desirable to avoid repeated compilation of the identical SQL request, and rely on previously compiled sections.

SUMMARY OF THE INVENTION

In accordance with another aspect of the present invention there is provided a database system comprising:
 a) a plurality of nodes
 b) a plurality of databases stored on the nodes; and
 c) a global dynamic SQL statement cache stored on at least one node; the global dynamic SQL cache being accessible to a plurality of applications in the database system.

In accordance with the present invention there is also provided a method of maintaining cache and application integrity across a relational database system comprising a plurality of nodes and a plurality of databases shared on the nodes, the method comprising the steps of: (a) providing for at least some of the databases, a global cached including information to enable agents to access the databases; (b) origination a request through a coordinating node, the coordinating node sending information on the dynamic SQL request to be executed to remote nodes: (c) having each remote node receive the request and check the global cache on the respective remote node for a current copy of the dynamic SQL entry; and (d) if the remote node does not have the current entry, the remote node requesting the coordination node to send the current version of the dynamic SQL entry and its section (e) having the global dynamic SQL cache be accessible for applications that are running at any node in the database system so that an application is able to re-use a cached copy of a previously inserted dynamic SQL entry and its section regardless of the node at which it was originally compiled.

Various aspects of the invention provide a data processing system, a method, and software for operating it where the data processing system includes a number of interconnected nodes. At least one data partition resides on one of the nodes, and one or more tables reside in a data partition. One of the nodes has a catalogue containing metadata describing tables and other objects and relationships therebetween in the data processing system. There is a global instruction cache at each node having a statement portion storing instruction statements and associated executables; each of the executable is designed for a particular environment; the instruction cache includes a dependency portion which lists objects and links them to the corresponding executable entries that depend on the objects; the instruction cache includes a shipped variation portion, each entry of the shipped variation portion refers to one executable entry and identifies the node from which the statement associated with the executable was originally shipped and the identification of such executable in the node from which it was originally shipped. The cache includes an invalidations in progress portion, each entry of the invalidations in progress portion refers to an object entry in the dependency portion.

In a further aspect of the invention the data processing system a catalogue node has a catalogue containing metadata describing tables and other SQL objects and relationships therebetween in the data processing system; wherein the SQL objects may include tables views of tables, aliases of tables, functions, and user defined types among others; a global SQL instruction cache at each node having a statement portion storing dynamic SQL statements and associated executables; each the executable being designed for a particular environment; the SQL cache includes a dependency portion which lists SQL objects and links them to the corresponding executable entries that depend on the objects; the SQL cache includes a shipped variation portion, each entry of the shipped variation portion refers to one executable entry and identifies the node at which the SQL statement associated with the executable was originally compiled and identification of such executable in the node at which it was compiled; the SQL cache includes an invalidations in progress portion, each entry of the invalidations in progress portion refers to an object entry in the dependency portion.

In yet a further aspect of the invention the data processing system the global SQL instruction cache includes a statement entry which includes:

SQL instruction statement text and a list of associated environment entries;

each the environment entry includes a description of the environment and a list of variations, each the variation includes: an identification number; the executable itself; a list of required privileges; a reference available to the entry in the shipped variation list portion of the cache.

Another aspect of the invention provides a method of executing an SQL request issued by an application from a node (a coordinator node) comprising: searching in a global SQL cache at the coordinator node for an executable that is associated with an SQL statement and environment corresponding to the SQL request; if the executable is not found in the global cache then the database management system compiles the SQL request at the coordinator node then inserts an executable entry into the global cache at the coordinator node; searching at the coordinator node in the global SQL cache for an SQL statement entry, the text of which matches the text of the SQL request; if the entry is not present at the coordinator node, inserting, by the database management system, a new SQL statement entry, the text of which matches the SQL request; if the entry is present then the database management system searches for environment entries associated with the SQL statement entry for an environment entry that matches the environment for which the SQL request was issued; if the entry is not present then the database management system inserts into the cache a new environment entry matching the environment of the SQL request; the database management system searches for a variation entry comprising a valid executable corresponding to the SQL request, which includes the SQL statement and environment entry, and, if a valid executable is not found then the database management system compiles the SQL request, referring to the appropriate environment, into an executable (a set of one or more executable instructions) to carry out the SQL request; inserting into a variation entry the compiled executable, including a list of required privileges, a list of dependent objects, an identification number of the variation entry, and identification of the validity of the entry; and, for each object in the list of dependent objects searching in the dependency portion of the global SQL cache for an object entry with a matching object name and object type, and if it does not exist in the cache, inserting a new entry.

The invention also provides for a data processing system having a plurality of nodes at which processing may be performed, a method of identifying an executable comprising identifying the executable by node identification and entry identification associated with the first node of the data processing system that shipped the executable to any other node in the data processing system.

Preferably the executable is identified by node and entry identification associated with the first node of the data processing system that compiled and shipped the executable to any other node in the data processing system.

Another aspect of the invention provides a method of indexing data and instructions for storage and retrieval for a multi-node data processing system comprising:

storing identification of the data and instructions in a list wherein the data and instructions are identified by node identification and entry identification associated with the first node that shipped the data and instructions to any other node.

Preferably the node list comprises an entry portion and a lookup portion wherein:

the entry portion stores the following:

SQL statements;

executables;

environment parameters;

entry identification for that entry in the list; and, wherein the lookup portion includes the following:

the entry identification;

the identification of the node that first shipped or compiled the executable;

entry identification of the executable at the node that first shipped or compiled the executable.

In still another aspect of the invention which may be used in a data base system, having a plurality of interconnected nodes, managed by a database management system, each of the nodes having an unique identification, the nodes being capable of storing or processing information, each node having a cache, the cache having a statement portion and a shipped variation portion;

the statement portion of the cache at each node for storing SQL statements, executables associated with the SQL statements, and environments with which the executables are associated, wherein the executables are each identified by an unique entry identification;

the shipped variation portion (list) for storing identification entries for the executables including:

identification (ID number) of the executable which corresponds to the identification (ID number) of the associated entry in the statement portion of the cache;

the node identification (ID number) of the node from which the executable was originally shipped from or compiled; and, the identification (ID number) of the executable at the node from which the executable was first shipped;

a method of executing a data processing request from a node (the coordinator node) in a manner adapted to avoid redundant shipping of executables comprising:

finding a suitable executable for carrying out the request by:

searching the statement portion of the cache at the coordinating node for an executable that is associated matching the request and environment in which the request was issued; and, if the matching statement and environment were not found in the statement portion of the cache of the coordinating node, then compiling the request and inserting the request into the cache;

sending a request to all other nodes of the data base management system that are necessary to process the request (subordinate nodes of the coordinating node) wherein the request to all other such nodes includes: the identification of the coordinator node and the entry identification of the executable, and if there is a entry in the shipped variation list associated with the executable on the coordinator node cache then the database management system also ships identification of the node and entry.

In yet another aspect the invention provides for use in a database system having a plurality of nodes, and being managed by a database management system, each node having a storage cache for indexing and storing instructions including statements, executables and environment information, a method of executing a request by an application at a first node wherein the application identifies the executable that is desired to be executed, searches at the first node for the executable, and, if the executable is not found at the node compiling the executable, then, using identification of the node by the node and entry identification of the executable on the node from which it was first shipped or compiled, requesting execution by all other nodes required for executing the executable;

the other nodes searching in their respective caches by the node and entry identification of the executable assigned by the node from which it was initially shipped or compiled; and, if the executable is found at each the other node executing it at each node at which it is found; and, if it is not found at one or more of the other nodes requesting that the executable be shipped from the first node to the nodes where the executable was not found; and, then executing the executable at each of the other nodes receiving it.

Another aspect of the invention also provides a method of performing data processing in a multi-node data processing system by sharing dynamic compiled (SQL) executable data processing statements between nodes of the data processing system comprising:

identifying each compiled SQL statement with a (numerical) identifier;

at a node receiving statements (a receiving node) storing a list of statements received at the receiving node listing the originating node and identifier for each of the received statements;

upon receiving a request for processing with a specified statement having the receiving node check its list of statements received for the specified statement by its originating node and identifier;

comparing the identification of the specified statement with the statements in the list of the receiving node, and if a match if found then accessing the statement stored at the receiving node;

if a match is not found, having the receiving node request the specified statement from another node, and when it is received then loading it into its local cache;

having the receiving node update its list of statements;

executing the statement at the receiving node.

In another aspect the invention provides a method for use in a data base management system having a plurality of interconnected nodes, each of the nodes having an unique identification, the nodes being capable of storing or processing information, one of the nodes comprising a catalogue node having metadata describing tables and other SQL objects and relationships between them in the data processing system;

each node having a cache, the cache having a statement portion and a dependency portion;

the statement portion of the cache at each node for storing SQL statements, executables associated with the SQL statements, and environments with which the executables are associated, wherein the executables are each identified by an unique entry identification;

the dependency portion for storing object entries for the SQL objects including:

identification of the object which corresponds to the object name and object type;

a list of entries referring to executable entries in the statement portion of the cache whose execution relies on the definition and existence of the object;

a method of updating entries in the cache at each node when object definition entries in the catalogue are changed comprising:

updating the catalogue node by removing all invalid entries and broadcasting instructions to other known nodes of system to remove invalid entries from their respective caches, by:

making a first broadcast of instructions to the nodes to secure entries in the dependency portion of each cache by first:

finding an object entry associated with the object that is being changed in the dependency portion of the cache;

if such an object entry in the dependency portion of the cache is not found, inserting a new object entry;

securing the object entry in the dependency portion of caches of the other nodes; marking all the executables currently listed as being associated with the object as invalid;

reporting to the database management system at the catalog node that the object entry in each of the caches have been marked as secured;

examining any executable newly arriving in a cache of a node and determining if it depends on an object that has been secured, and if so, marking it as invalid;

making a second broadcast from the catalog node to all known nodes to:

mark all entries in the caches which are dependent on a secured object or an invalid object as being invalid; and, removing the secured marking of all secured objects;

removing all invalid entries and objects.

In a further aspect of the immediately above method entries are updated in the cache at each node when a node is added to the database comprising:

when a new node is added to the database system, sending from the catalogue node a list of all secured objects to the new node;

at the new node, for all the objects in the list of the objects secured at the catalog node, creating and securing a new object entry in the dependency portion of the cache of the new node;

at the new, nodes examining any executable newly arriving in the cache of the new node and determining if the executable depends on an object that has been secured, and if so, marking it as invalid.

A further aspect of the invention provides a computer program product comprising computer readable storage for storing statements or instructions for use in execution in a computer in accordance with one or more aspects of the invention described above.

DETAILED DESCRIPTION OF THE PREFERRED EMBODIMENT

Figure 1:
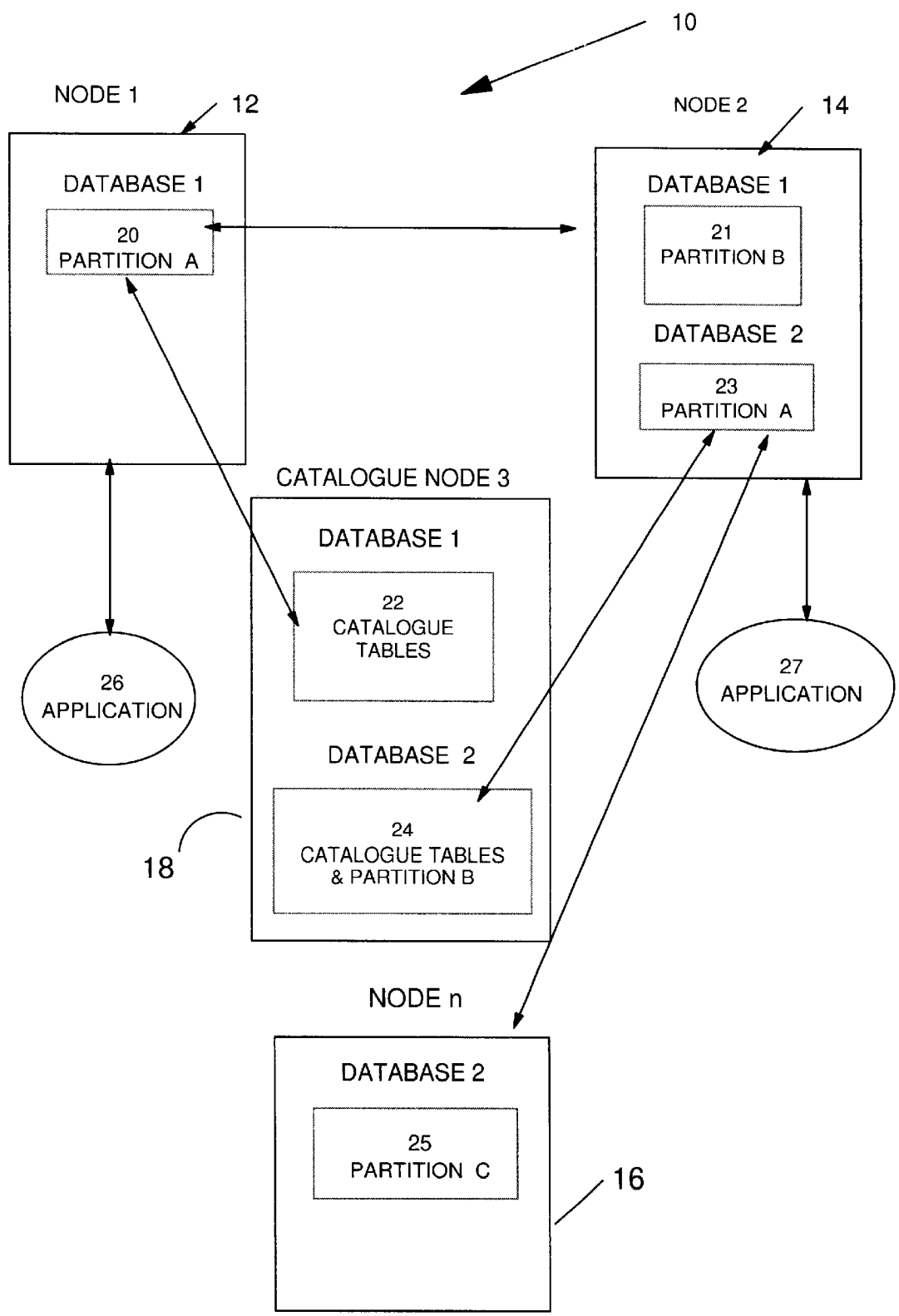
FIG. 1 depicts a multi-node database management system.

FIG. 1 is a conceptual diagram of a Relational Database Management System (RDBMS) 10. The RDBMS of 10 of FIG. 1 illustrates only one of many configurations available in an RDBMS and is intended only to show a networked system that may utilize the present invention. In the configuration as shown, RDBMS 10 contains a plurality of nodes (12, 14, 16, 18). Each node (12, 14, 16, 18) may contain a partition or all of a database. In the example of FIG. 1, the RDBMS has two databases, although any number of databases can be provided, the content of which is partitioned among the plurality of nodes. The first of these databases is divided into a partition 20 and a partition 21. The catalogue 22 for this first database is stored on catalogue node 18. The catalogue 22 contains tables in which resides all the "meta-data" such as the structure, tables, packages and functions relating to the first database. The second database is divided into partitions 23, 24 and 25. Note that in the illustrated example, the partition 24 of the second database also contains the catalogue tables for the second database. Thus, a catalogue node 18 may contain data as well as catalogue tables. Catalogue tables are per database and can be located at different nodes for different databases. This means that the term "catalogue node" is relative per database, i.e. the catalogue could reside on any node.

The Global Cache

The global cache acts as a repository for package and section information for static SQL and statement and section information for dynamic SQL as detailed below.

In this disclosure, we discuss the method and apparatus for the dynamic SQL cache only.

In the preferred embodiment, the global cache is kept at the database level, and is accessible to all agents for a database at a particular node of the database (physical or logical). It is allocated from the same memory set as other database-level entities, such as the lock list or buffer pool; it is created when the database is initialized, and it remains active until the database is shut down. The global cache acts like a "public" library for all the agents using the database at a given node. Agents simply copy the package information and the modifiable portions of the sections (e.g. buffers and flags).

Figure 2:
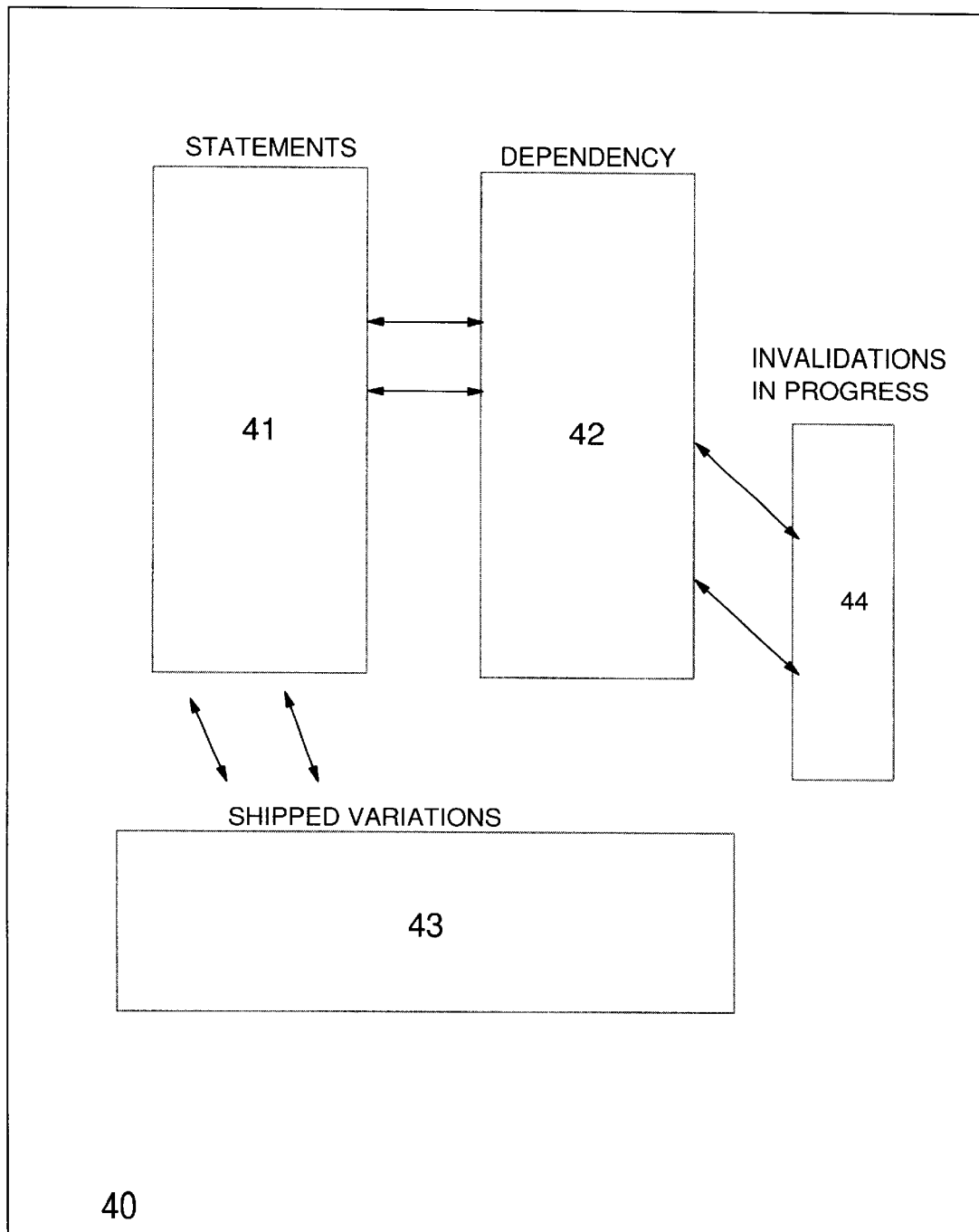
FIG. 2 depicts a dynamic SQL cache.

Referring to FIG. 2, the dynamic SQL portion 40 of the global cache is subdivided into four portions: the statement portion 41, the dependency portion 42, the shipped variation portion 43 invalidations in progress list portion 44. The statement portion 41, also known more generally as the entry portion of the cache contains SQL statement entries 62 which contain the text of the cached dynamic SQL statements as well as the different sections compiled for each SQL statement. The statement portion 41 of the dynamic cache 40 is used to support application requests to prepare the dynamic SQL statement 64 and obtain an executable section. The dependency portion 42 of the dynamic cache 40 contains entries for all the objects upon which the cached dynamic SQL sections are dependent. This information is used to support cached object invalidation due to data definition language statements and other database activities. The shipped variation portion 43, also known as the lookup portion of the cache is a list used to lookup entries that have been shipped from other nodes of the database system. The invalidations in progress portion 44, contains a list of objects that are currently being modified in the database management system.

Figure 3:
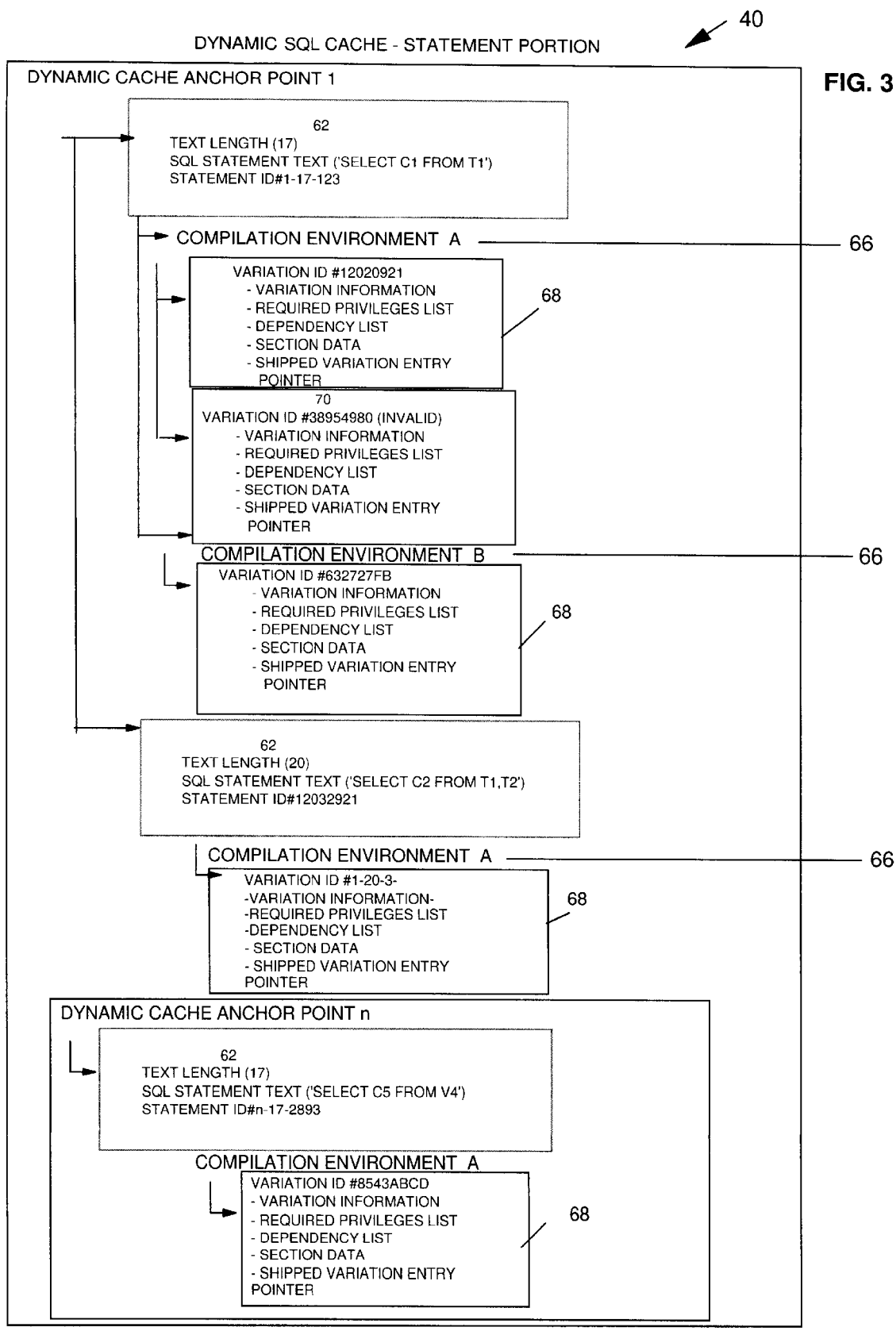
FIG. 3 depicts the structure of the dynamics SQL portion of a global cache.

Referring to FIG. 3, the primary structure of the dynamic SQL portion 40 of the global cache is based upon the unique text for a given SQL statement 64, which is stored within SQL statement entry 62. A SQL statement entry 62 contains characteristic information about the SQL statement 64 that is determined once the first occurrence of the statement text 64 is compiled. This information is invariant since the statement text 64 is constant and these characteristics are inherent in the statement text 64 itself, independent of the environment in which it was compiled.

The compilation environment 66 contains information on the environment used to generate or compile the section. The compilation environment 66 contains all information not already contained in the catalogue tables, that influence or control an access plan created by the SQL compiler, and thus the section.

Below each compilation environment 66 are stored individual units known as "variations" 68. A variation 68 represents a unique section for the statement text 64, where the uniqueness is specified by the compilation environment 66 used to generate the section. The compilation environment 66 encompasses all those elements that affect the nature and result of the section generated by the SQL compiler for a dynamic SQL statement (e.g., special registers, relevant package compilation defaults, use of default qualifiers, use of function path, etc.). Note that since privileges do not affect the actual section generated, only whether it is allowed to be executed, the prerequisite privileges for a dynamic SQL statement 64 are irrelevant to the compilation environment 66. In the preferred embodiment, privileges are not part of the compilation environment 66.

A variation 68 is simply the representation of the fact that two application issuing the same dynamic SQL statement 64 in the same context with the exact same compilation environment 66 should generate the exact same section, although the results of execution may differ due to actions within the individual units of work. For example, two applications using the same section for SELECT C1 FROM T1 may return different results if the first application has inserted some rows into T1 but not committed its changes. The first application will get the row returned by the section, but the second application may not.

In addition to the identifying compilation environment, each variation 68 under a statement entry 62 and compilation environment 66 also contains: the required privileges list of privileges needed to execute the section, the dependency list for the section and the section generated for the specified compilation environment, and a pointer (reference) to an entry in the shipped list. The dependency list refers to those objects and entities in the catalogue tables required, either directly or indirectly, by the section for a variation 68. The dependency list is also used to determine whether the section is no longer valid when an object on the dependency list is dropped; if the variation 68 is in use at the time, the drop request is rejected. When a section is no longer valid, the variation 68 becomes an invalid variation 70 and must be regenerated. Details of the dependency list and its use to invalidate dynamic SQL sections is discussed below in the description of FIG. 4. The major difference between dependencies and privileges is that the loss of privileges does not result in any variation 68 being marked as an invalid variation 70 since, as noted previously, privileges do not affect the contents of the section. Since a variation 68 represents a dynamic SQL statement, and dynamic SQL always reflects the current environment, other actions such as issuing the RUNSTATS command against a table or creating a new User Defined Function (UDF) can cause a variation to be marked invalid.

Each dynamic SQL statement entry 62 may have one or more compilation environments 66, but each compilation environment 66 may contain only one valid variation 68. An invalid variation 70 will be flushed from the cache during cache space management. For example, an ALTER TABLE statement can cause a variation 68 to become an invalid variation 70 in the dynamic cache 44 and will eventually be flushed from the dynamic cache 44.

The variation entry includes a pointer or reference to an entry in the shipped variation list, if such an entry exists.

Figure 4:
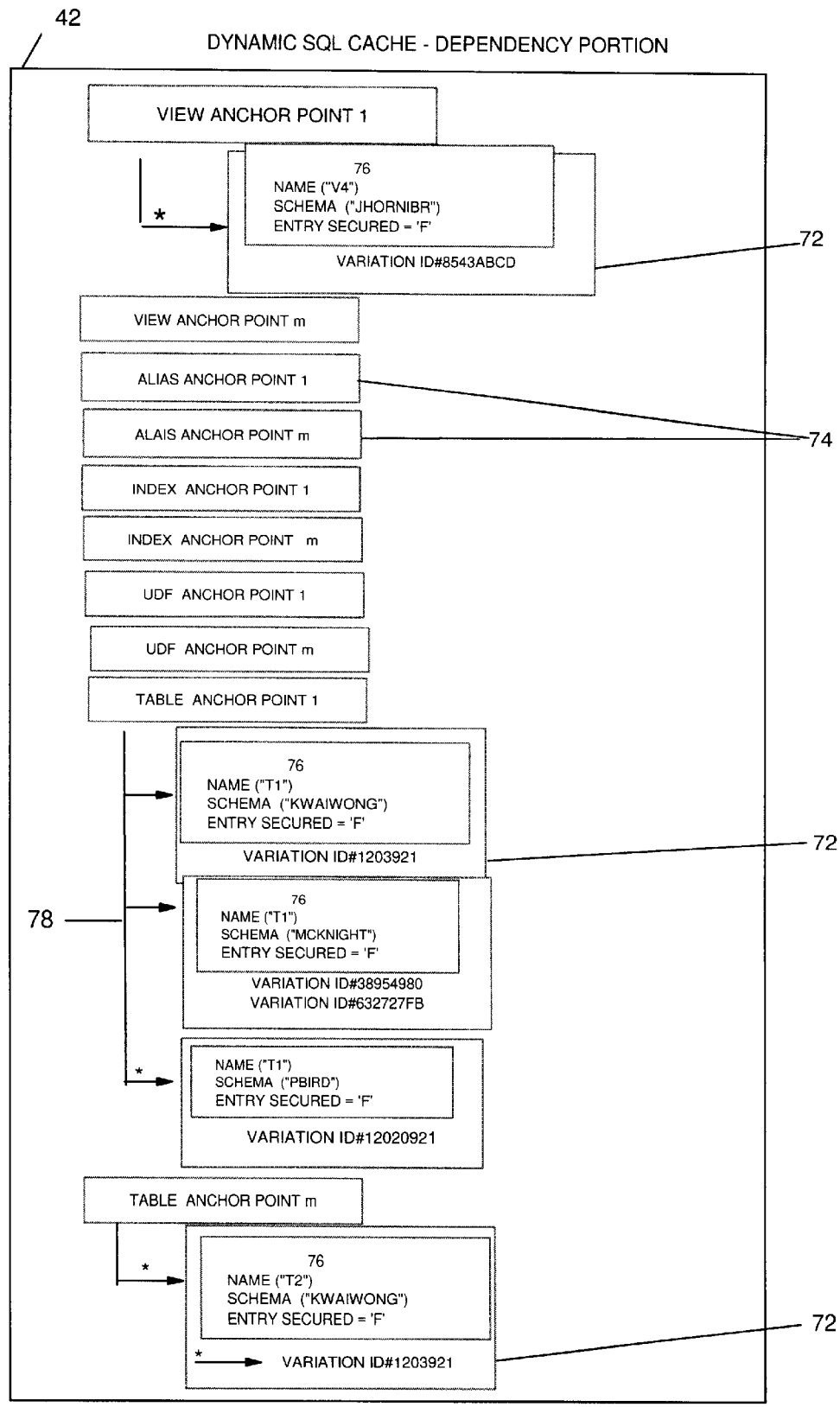
FIG. 4 depicts the basic unit of the dependency portion of a dynamic SQL cache.

Referring now to FIG. 4, the basic unit of the dependency portion 42 of the dynamic SQL cache 40 is the object 72. An object 72 represents a database object upon which a dynamic SQL variation 68 is dependent. Each object 72 is associated with one or more variations 68. Each object 72 in the dependency portion 42 of the global cache is distinct and only one occurrence of the object 72 may appear at any one time. To facilitate access, each object 72 is associated with a specific object type anchor point 74 by hashing the qualified object name 76 to a unique anchor point 74. Once associated with an anchor point 74, the object 72 is inserted into the list of objects 78 off that anchor point 74 in alphabetical order based on the object name 76 followed by the qualifier. Anchor points 74 are type specific (i.e. an alias anchor point only holds aliases) and only objects 72 of the type represented by the anchor point 74 are to be found off that anchor point 74. In the present embodiment, this includes objects of types: view, alias, index, User Defined Functions (UDF), table, structured types, summary tables, hierarchies, pagesizes, summary tables and hierarchical tales. In addition, a field is kept for each object, indicating whether the entry is secured.

An essential characteristic of a dynamic SQL statement is that the running of it should reflects the current database environment as if it were compiled for everytime the query were issued; the dynamic SQL cache 44 does not alter this characteristic. If an environment change affects a dynamic SQL section, the variation 68 for that section will become an invalid variation 70. When invalidating a dynamic SQL variation 68 due to a change in a dependent object, the name of the affected object 76 is hashed to obtain the appropriate anchor point 74 for the same object type. The list of objects 78 is then scanned to find a matching object 72. Once a matching object 72 is found, the list of dependent variations below that object is scanned and an attempt is made to invalidate them in the statement portion of the cache.

Figure 5:
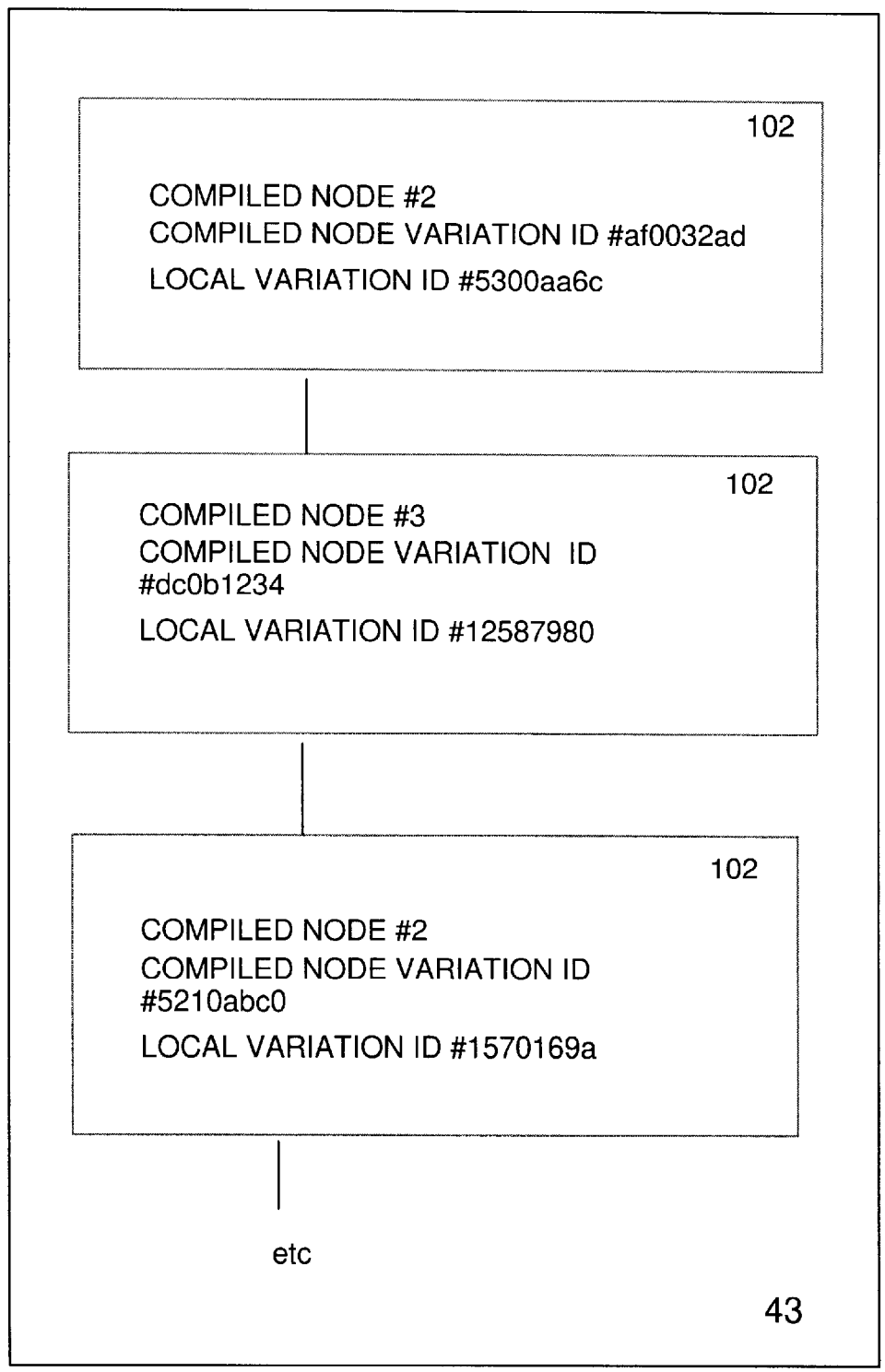
FIG. 5 depicts the shipped variation portion of a dynamic SQL cache.

Referring to FIG. 5, the shipped variation portion 43 of the cache is comprised of a list of zero or more "shipped" entries 102. Each shipped variation entry 102 refers to only one variation entry in the statement portion of the cache. The entry is identified by "original node" identification, that is it includes the node # at which the variation was originally compiled and shipped, as well as the variation ID at that node at which the variation was compiled. This original node information is used for lookup purposes. The shipped variation entry also includes the ID of the variation in that node's global SQL cache, so that once a match is found in the shipped variations list based on the original node information, the entry then refers to the actual local entry in the current node's cache. Note that the original node information does not necessarily correspond with the node, and variation ID corresponding to the coordinating node that actually shipped the query.

Figure 6:
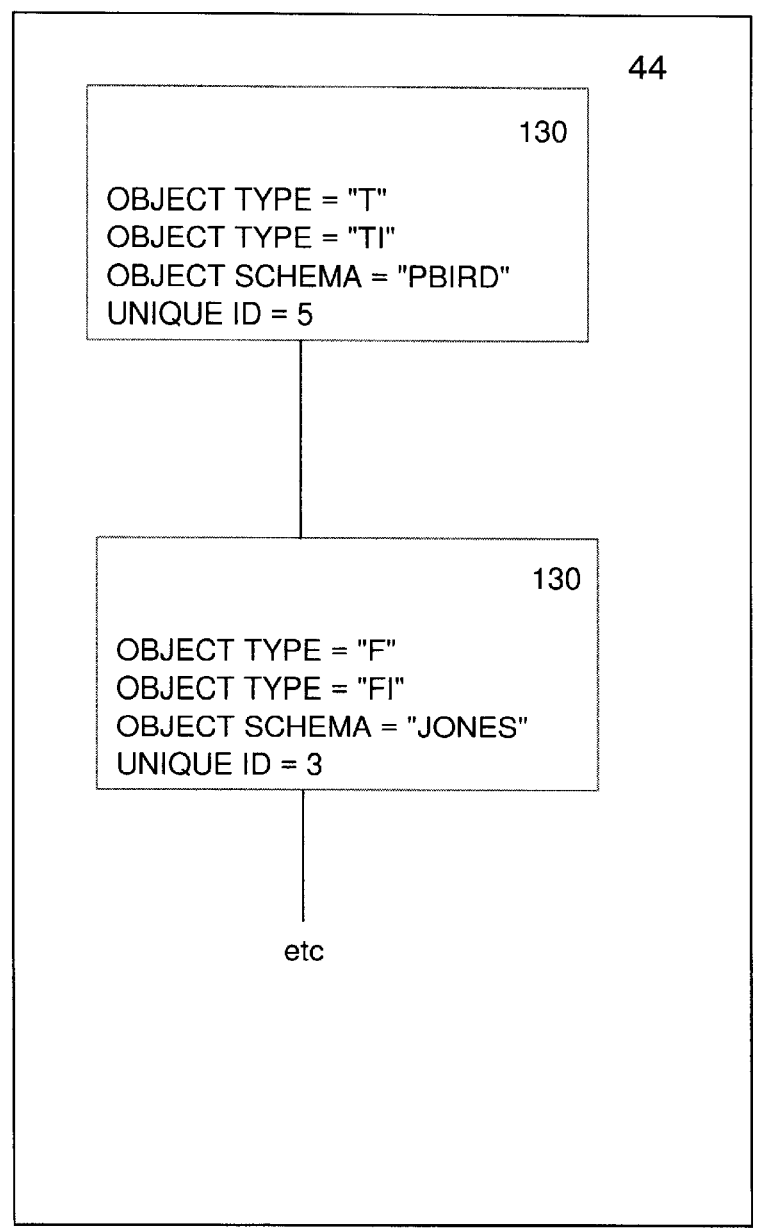
FIG. 6 depicts the invalidation in progress portion of the cache.

Referring to FIG. 6, the "invalidations in progress" portion 44 of the cache is comprised of zero or more entries 130. Each entry indicates an object that is in the process of being dropped, altered, or otherwise causing invalidation.

This object refers to an entry in the dependency portion of the cache. For the catalog node, entries are added to this list when an attempt to modify the definition of a specific object is made. At other nodes Entries are only added at node startup/registration time as noted in the description of node startup.

Multi-node Execution and Cross-node Sharing

Figures 7, 7A:
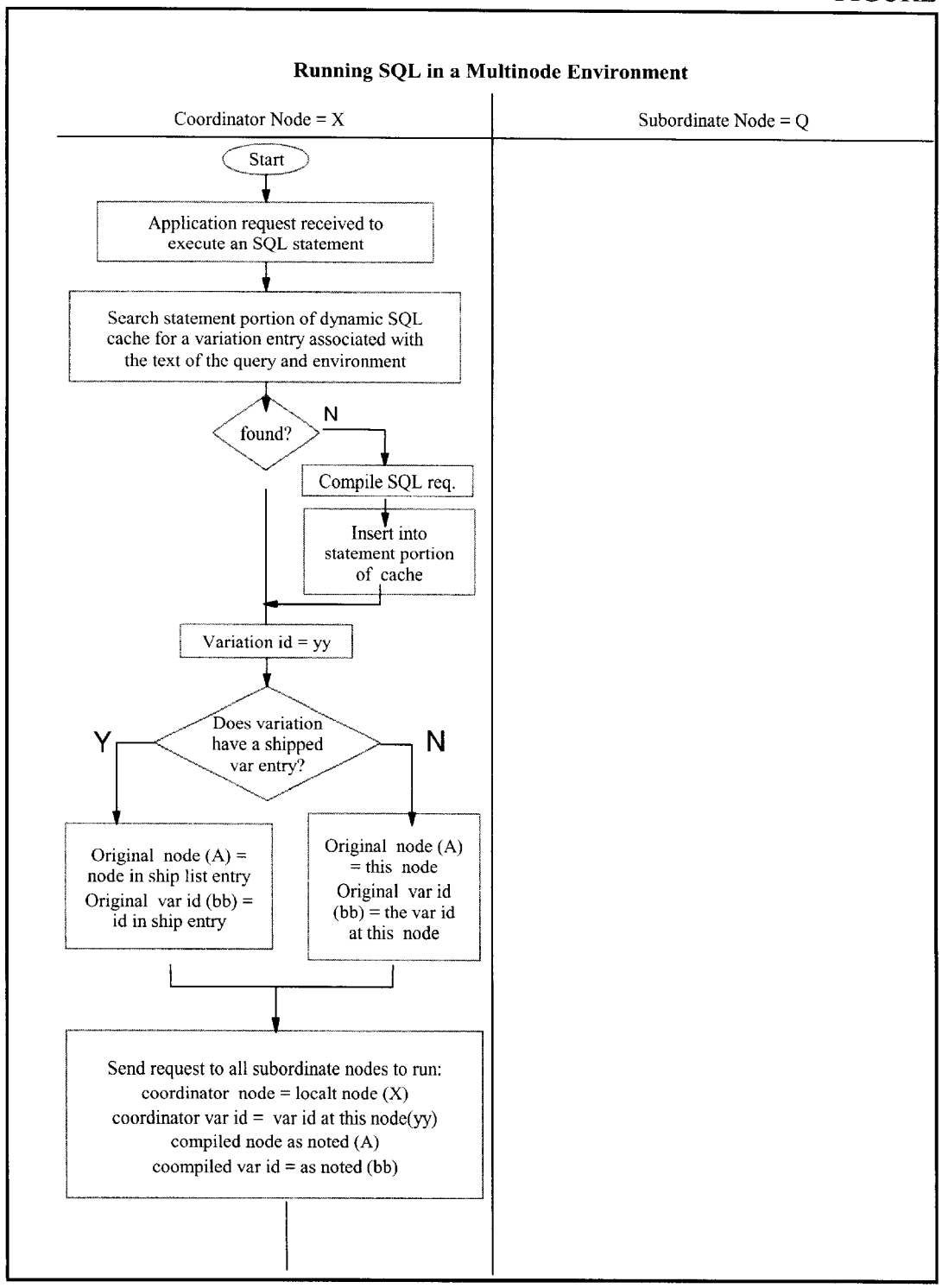
FIGS. 7A, 7B, and 7C depict a flow chart illustrating an embodiment of the present invention for executing SQL requests in a multi-node environment.
Figures 7, 7B:
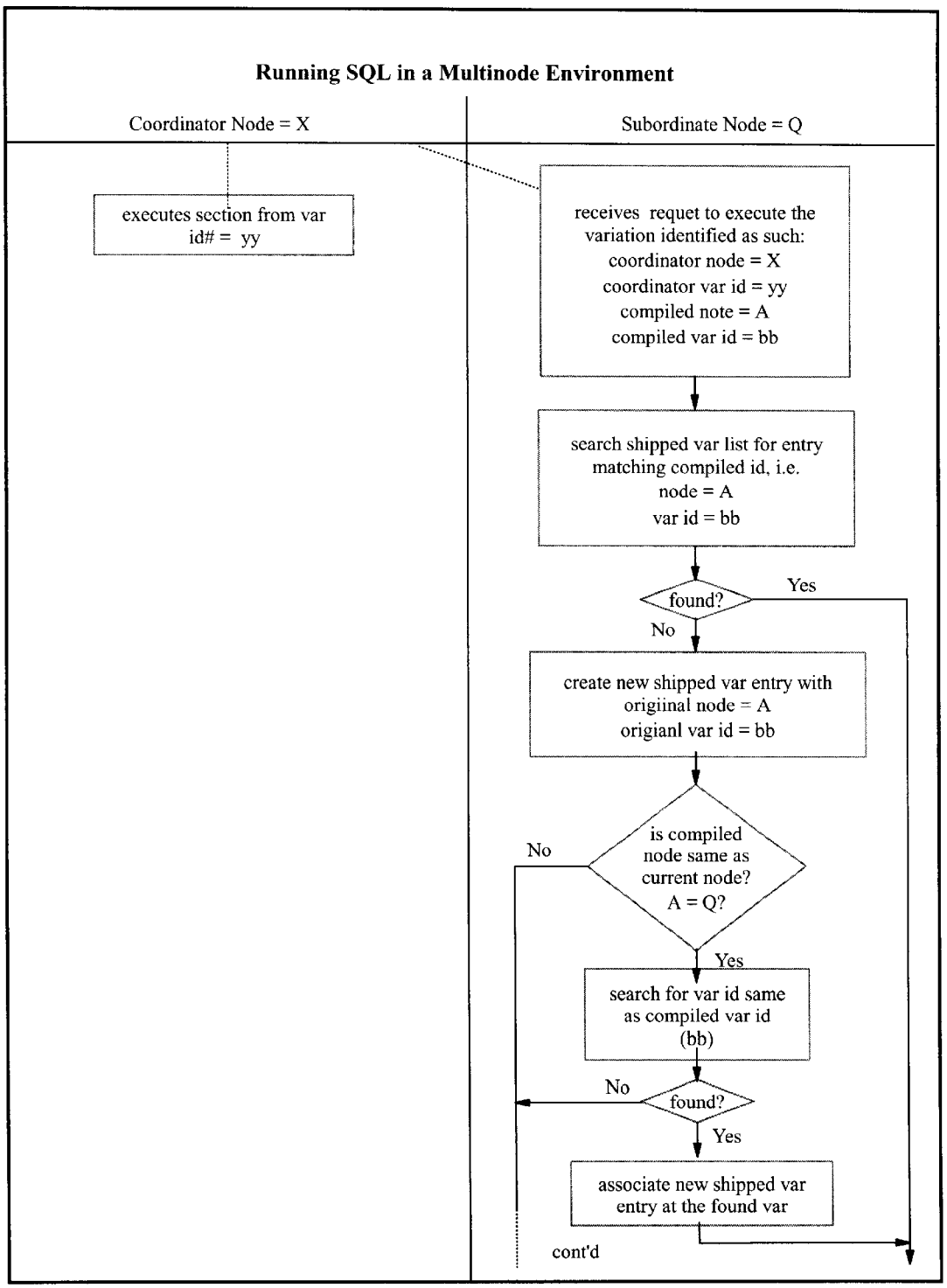
Figures 7, 7C:
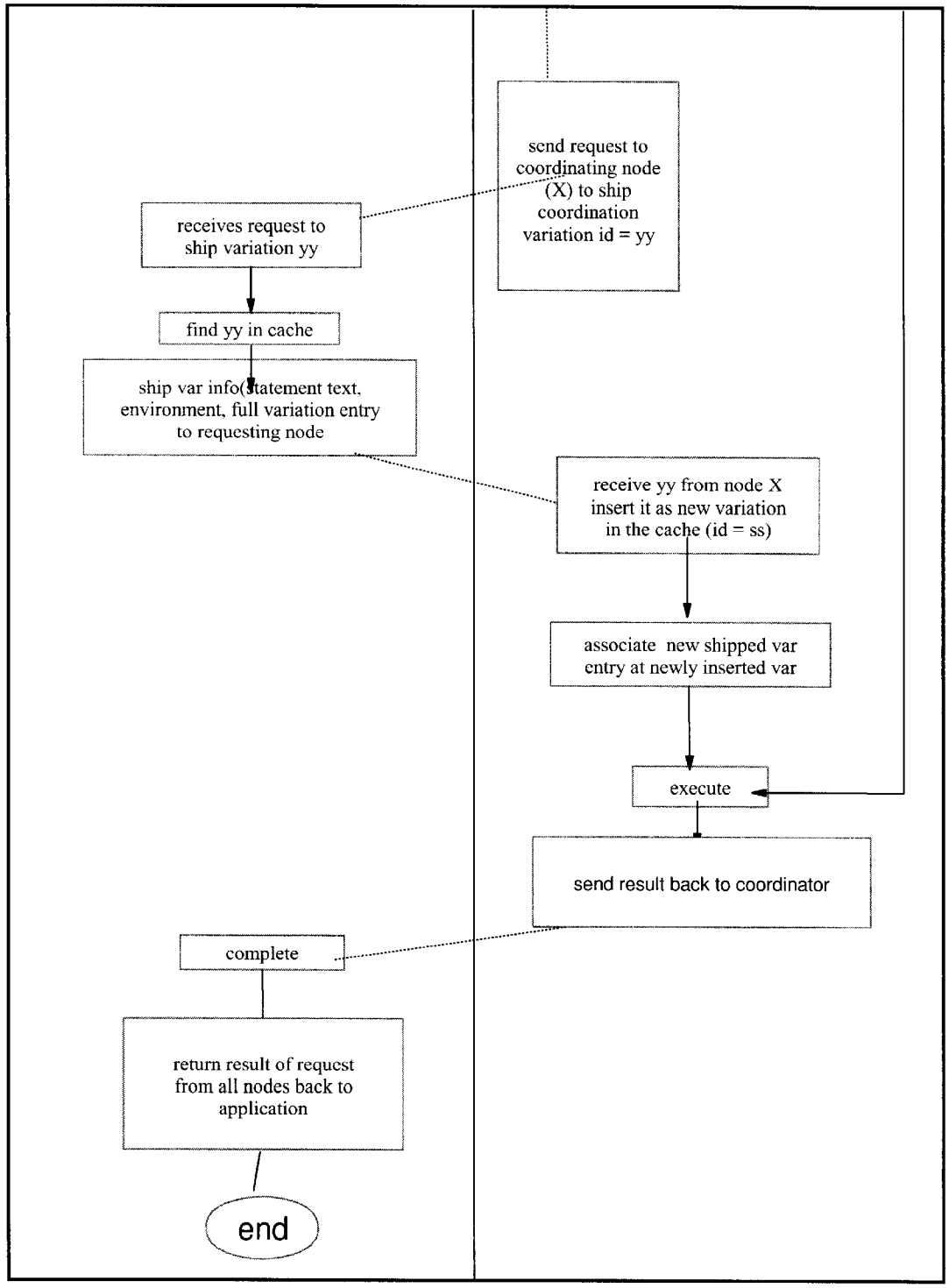

Referring to FIGS. 7A, 7B, and 7C, an algorithm is a method for executing SQL in a multi-node environment is described. In this method, it is ensured that the SQL request is carried out by the database management system on behalf of the application on all the nodes relevant to that query. As well the method of lookup and identification of the appropriate variation entry on the subordinate node is optimized for an environment where identical SQL requests are issued by applications at many different nodes of the application. By appropriately labeling the shipped variation entry with the node number and the id of the variation at which the section was originally compiled, needless duplication of entries is eliminated and communication costs are greatly reduced.

The method as noted in the diagram is as follows. An application issues a request to execute an SQL statement that is received by the database manager at the coordinator node. Searching for a match based on the SQL statement and environment of the application request, a search is made in the statement portion 41 of the dynamic SQL cache 40 at the coordinator node. If a match is not found, a new variation entry is inserted appropriately into the statement portion of the cache at that node. At this point the variation entry, identified by an id unique to the coordinator node, is in place; this variation entry includes the section (executable) that is to be executed at this node and a number of subordinate nodes. An 'identifying' request is sent to the subordinate node(s) to execute the section from an appropriate variation entry in the subordinator node that matches the variation entry at the coordinator. To do this, the request identifies the appropriate entry by the following information:

local node identification comprising the coordinator node id and the variation id at the coordinator node and original node identification, which comprises the node at which this variation entry was originally compiled and shipped from and the variation id at that original node. The original node identification is derived from the shipped variation entry associated with the local variation id. If the variation does not have a shipped variation id (which would be the case if this variation is new and the section was just compiled; it also would be the case if this node has always been a coordinator node with respect to this SQL request and never a subordinate node), then the original node identification is set to be identical to the coordinator node identification.

At the subordinate nodes, this request to run the section of the variation identified as indicated is received by the DBMS. The shipped variation lookup list is searched to find an entry that matches the original node identification indicated above. If a match is found in that list based on the original node identification, then it refers to a variation in the statement (entry) portion from the cache, the section of which can then be used to run the query at that node.

If the a matching shipped variation entry is not found based on the original node identification, then the DBMS creates a new shipped variation entry in the shipped variation list, whose original identification is as supplied in the request. At this point this shipped variation entry does not correspond to a variation entry in the cache. The DBMS then determines if the original node number identified in the request matches the node number of the current subordinate node. If it is, then, since his current subordinate node is the original node, then we search the statement portion of the cache for the original node variation id. If this id is found (which is not necessarily the case; it may have been removed from the cache at this node by this time), then the desired variation has been found and the new shipped variation entry created above is set to be associated with (pointing to) this variation.

However if the current subordinate node is not the same as the original node—or if they are the same, but the original variation entry was found to no longer exist in the cache, then the DBMS needs to request that this variation entry be 'shipped' from the coordinator node. (Note, it cannot assume that it can request from the original node to find the entry as the entry is not guaranteed to be in the original node's statement portion of the cache; however since the coordinator node originated the request, we know that it is guaranteed to have the entry still present in its cache). Thus a new 'ship' request is sent back to the coordinator node (as determined from the local node identification part of the first identifying request), requesting that that node send back the full information associated with its local variation, whose identification number is sent to the coordinator node as the 'local' variation id. This request is received at the coordinator node, which then finds the id of the variation specified and sends back all the relevant information (including the statement text, the environment entry, and all other information associated with the variation including the section (executable). At the subordinate node, this information is received and then, based on the statement and environment information, a new variation and its companion entries are placed in the statement portion of the cache (as well as any associated dependency entries in the dependency portion of the cache). The newly created shipped variation entry (which indicates the original node information of this variation) in the shipped variation portion of the cache is then associated with (pointed to) with this new variation in the statement portion of the cache.

By having the shipped variation list lookup based on the "original node ID" we allow much more efficient cross node sharing.

The alternate, prior art solution can be summarized, via example as follows:

Application A connected at node 1 inserts or finds an existing variation entry for the executable version of the dynamic SQL at the SQL cache at node 1. It has a unique id, say NNN.1. It sends a request to relevant nodes to execute validation NNN.1 from node 1. At each of these other nodes, a lookup is performed in its shipped variation list to determine if there is an entry for NNN.1 from node 1 that has already been shipped to this node. If not, it requests that node 1 ships that NNN.1 entry information to the current node; once shipped an executable entry for the original text is inserted into the cache at that node as well as an entry in the shipped list indicating that the new entry has been shipped as NNN.1 from node 1. As long as that entry is in the cache this entry in the shipped list ensures that anyone who issues the same text associated with entry NNN.1 at node 1 will also be able to have the SQL run on its behalf at other nodes without additional shipping.

In an environment where cross-node sharing is allowed, we find that this scheme by itself, while providing for a solution that works, will involve extra shipping of dynamic SQL entries. Consider the following three nodes of a multi-node database, in which different applications connected at each of the nodes issue the same dynamic SQL text: "INSERT into t1 values 1* ", and where t1 is a table whose partitioning includes nodes 1, 2 and 3. In this case application A connects to the database at node 1, application B at node 2, and application C at node 3, and chronological execution at all 3 nodes proceeds down the diagram. The "values" entry "1" was merely chosen as an example.

| Node 1 | Node 2 | Node 3 |
|---|---|---|
| A: application issues "INSERT into t1 values 1*", The statement gets compiled and a dynamic SQL executable is inserted into the cache for this variation, with variation ID = NNN.1. Sends out a request to other nodes to execute NNN.1 from node 1 B: receives a request to execute MMM.2 from node 2. Cannot find an entry in the shipped list, so it pulls the entry for MMM.2 from node 2. This new entry is inserted into the cache as LLL.1 and a shipped list entry is added indicating that this new entry came from MMM.2 from node 2. The existing entry (NNN.1) that matches the same statement text is marked as not current. C: receives a request to execute QQQ.3 from node 3. Cannot find an entry in the shipped list, so it pulls the entry for QQQ.3 from node 3. This new entry is inserted into the cache as UUU.1 and a shipped list entry is added indicating that this new entry came from QQQ.3 from node 3. The existing entry (LLL.1) that matches the same statement text is marked as not current. | A: Receives a request to execute NNN.1 from node 1. Cannot find an entry in the shipped list, so it pulls the entry for NNN.1 from node 1. This new entry is inserted into the cache on node 2 with unique id = MMM.2. A shipped list entry is also added indicating that this new entry was brought as NNN.1 from node 1. Application B: issues "INSERT into t1 values An entry for this statement is found in the cache (MMM.2). Sends a request to other nodes to execute MMM.2 from node 2. Application B: issues INSERT into t1 values 1*". An entry for this statement is found in the cache (MMM.2). Sends a request to other nodes to execute MMM.2 from node 2. C: receives a request to execute QQQ.3 from node 3. Cannot find an entry in the shipped list, so it pulls the entry for QQQ.3 from node 3. This new entry is inserted into the cache as TTT.2 and a shipped list entry is added indicating that this new entry came from QQQ.3 from node 3. The existing entry (MMM.2) that matches the same. | A: Receives a request to execute NNN.1 from node 1. Cannot find an entry in the shipped list, so it pulls the entry for NNN.1 from node 1. This new entry is inserted into the cache on node 3 with unique id = SSS.3. A shipped list entry is also added indicating that this new entry was brought as NNN.1 from node 1. B: receives a request to execute MMM.2 from node 2. Cannot find an entry in the shipped list, so it pulls the entry for MMM.2 from node 2. This new entry is inserted into the cache as QQQ.3 and a shipped list entry is added indicating that this new entry came from MMM.2 from node 2. The existing entry (SSS.3) that matches the same statement text is marked as not current. C: Application issues: "INSERT into t1 value 1*". An entry for this statement is found in the cache (QQQ.3). Sends a request to other nodes to execute QQQ.3 from node 3. |

It can be seen in this prior art implementation that when an attempt is made to share the cached dynamic SQL that has been shipped from another node we end up needlessly pulling extra copies of what is already in the cache to other nodes. This causes extra demands on the networks, poorer performance and extra demands on the memory of the nodes' SQL caches. Note that this needless shipping back and forth of the same SQL entry can continue if applications at each of the nodes continue to issue that same SQL text.

To solve this performance/resource problem, the identification of the dynamic SQL entry in the shipping process is based on original node information, which corresponds to the identification of the entry at node the request was originally compiled and shipped from. It is this compiled-at node information that is used to maintain and search the shipped list. The node at where the SQL is issued will send a request to all other nodes indicating not only which entry from the current node to execute, but also the node where the SQL was originally compiled. Further details can be seen in the revised flow of the previous scenario, where the same SQL request is issued in order from node 1, node 2 and node 3.:

| Node 1 | Node 2 | Node 3 |
|---|---|---|
| A: Application issues "INSERT into t1 values 1*". The statement gets compiled and a dynamic SQL executable is inserted into the cache for this statement, with unique ID = NNN.1. Sends out a request to other nodes to execute NNN.1 from node 1, originally compiled as NNN.1 at node 1. B: receives a request to execute MMM.2 from node 2 that was originally compiled as NNN.1 at node 1. Since this is node 1, NNN.1 is found to exist, so the MMM.2 entry will not have to be pulled from node 2. C: receives a request to execute SSS.3 from node 3 that was originally compiled as NNN.1 at node 1. Since this is node 1, | A: Receives a request to execute NNN.1 from node 1 which was originally compiled as NNN.1 from node 1. Cannot find an entry in the shipped list, so it pulls the entry for NNN.1 from node 1. This new entry is inserted into the cache on node 2 with unique id = MMM.2. A shipped list entry is also added indicating that this new entry was originally compiled as NNN.1 from node 1. B: Application issues "INSERT into t1 values 1*". An entry for this statement is found in the cache (MMM.2). Sends a request to other nodes to execute MMM.2 from node 2, which was originally compiled as NNN.1 from node 1. C: receives a request to execute | A: Receives a request to execute NNN.1 from node 1 which was originally compiled as NNN.1 from node 1. Cannot find an entry in the shipped list, so it pulls the entry for NNN.1 from node 1. This new entry is inserted into the cache on node 2 with unique id = SSS.3. A shipped list entry is also added indicating that this new entry was originally compiled as NNN.1 from node 1. B: receives a request to execute MMM.2 from node 2 that was originally compiled as NNN.1 at node 1. An entry is found in the ship list corresponding to an original compilation of NNN.1 at node 1, so the MMM.2 entry will not have to be pulled from node 2. C: Application issues "INSERT into t1 values 1*". |

-continued

| Node 1 | Node 2 | Node 3 |
|---|---|---|
| NNN.1 is found to exist, so the SSS.3 entry will not have to be pulled from node 3. | SSS.3 from node 3 that was originally compiled as NNN.1 at node 1. An entry is found in the ship list corresponding to an original compilation of NNN.1 at node 1, so the SSS.3 entry will not have to be pulled from node 3. | An entry for this statement is found in the cache (SSS.3). Sends a request to other nodes to execute SSS.3 from node 3 that was originally compiled as NNN.1 at node 1. |

Thus, by organizing the search in the shipped variation list based on the id and the node of the entry where it was first compiled, we are able to avoid needless shipping of entries and needless insertion of entries. In this example this method has changed the shipping situation: in which there are 3 insertions of entries on node 1 (one a compile, and two from shipping), 2 insertions of shipped entries on node 2, and 2 insertions of shipped entries on node 3 with the original scheme; with the proposed method each node has only one entry inserted, which implies an increase in performance by reducing the network traffic and the programming steps required to ship and entry from node to node and then insert it at the new node. By this identification schema, space usage in the cache is also reduced.

The Participating Nodes List and Node Startup

In order to minimize network traffic and to allow for the ignoring of nodes that are either down or have not connected to a particular database, a list of participating nodes for a database is built and maintained on the catalogue node. A participating node is a node which is active, connected to the database and has registered in the participating nodes list at the database catalogue node.

The list of participating nodes is used to define which nodes must be informed when a communication bulletin (described hereinbelow) is to be broadcast for a database. The information is broadcast to all nodes in the list of participating nodes other than the current one (catalogue node) by the agent wishing to send the information. Before any broadcast, the broadcasting agent must acquire the latch for the list of participating nodes to prevent any new nodes from being added. Processing for the cache at the catalogue node is handled by the broadcasting agent.

Invalidating Dynamic SQL

Certain actions affecting the definition of objects can be render a variation and its associate section (executable) invalid. That is, it should not be executed, otherwise internal system errors could occur. As an example, if the statement "SELECT*SNOWBELL.T1" is complied and inserted into the cache, then the action "DROP TABLE SNOWBELL.T1" must ensure that all variation in the cache, including the one for the statement above, are not being executed, and are marked as invalid, to prevent further execution.

In a multi-node environment, the request to invalidate based on an object drop/modification must be broadcast to all nodes from the catalogue node, in such a way that it is ensured that there are no variations that depend on the object on any other node that are still considered valid on any node.

The prior art for modifying objects involved sending a single broadcast from the catalog node to all nodes in the system. At each of the nodes in the system, the dependency portion 42 of the dynamic cache 40 is searched for an entry that matches the object name and object type of the object being modified. If an entry is found, then all the variations in the statement portion of the cache, that are referred to by this object entry in the dependency portion of the cache are marked as invalid. This proves to be adequate in a database management system that does not allow sharing. In that case a lookup in the statement portion of cache to match an SQL request will not be considered successful if it is found that the entry was in fact originally compiled at another node. However when the system allows sharing, there are situations in which, due to the timing of invalidation broadcasts and concurrent shipping of variations that may be happening on the system, a shipped variation may end up on one of the nodes caches that should be marked as invalid but in fact manages to remain marked as valid. If a new application issuing the same SQL on the shipped-to finds the entry in the cache, and sharing is allowed, it will use an invalid entry which could cause DBMS system failures. For illustrative purposes, on such a scenario is indicated in the 3 node table as follows (where chronological execution at all 3 nodes proceeds down the diagram; consider node 0 to be the catalog node).

| Node 0 | Node 1 | Node 2 |
|---|---|---|
| B: "DROP table T1" sends request to all nodes to invalidate all SQL dependent on T1<br>B: Receives notice that all nodes have finished invalidating and drops the table | A: Application A issues: "INSERT into T1 values 1, 2, 3"; a matching entry is not found in node 1's cache, so it is compiled and executable inserted into cache at node 1 with ID = xx. This executable is executed on this node and a request is sent to node 2 to execute ID = xx from node 1<br>B: Receives request to invalidate all SQL dependent on T1 - has to wait behind application A to finish executing the INSERT on all nodes before entry xx is removed | B: Receives request to invalidate all SQL dependent on T1 and finds no object entry in dependency portion of the cache; nothing to invalidate<br>A: receives request to execute xx from node 1 and ships a copy over from node 1 and inserts into cache at node 2 the entry for "INSERT into T1 values 1, 2, 3". Executes and informs Node 1 that it has done. The entry for this statement remains in the cache<br>C: Application C issues: "INSERT into T1 values 1, 2, 3". An entry for this is |

-continued

| Node 0 | Node 1 | Node 2 |
|---|---|---|
| | A: receives notice that node 2 has completed executing the request, completes executing and frees up the xx entry in the cache to be deleted<br>B: now that A has finished, it deletes the xx entry for the INSERT | found in the cache from when app A shipped it over from node 1. However this entry refers to a dropped table and should not be valid. Danger!!! |

It can be seen in this example that with respect to the application executing, the broadcast event reached the subordinate node before the variation entry had been shipped from the coordinator node, thus not finding an entry in the dependency portion 42 of the cache. A valid entry ends up at the subordinate node, and then if an application at that node later tries to 'share' that entry it would find an entry that looks to be valid.

Invalidating Method—Two Phase Broadcast

Figure 8A:
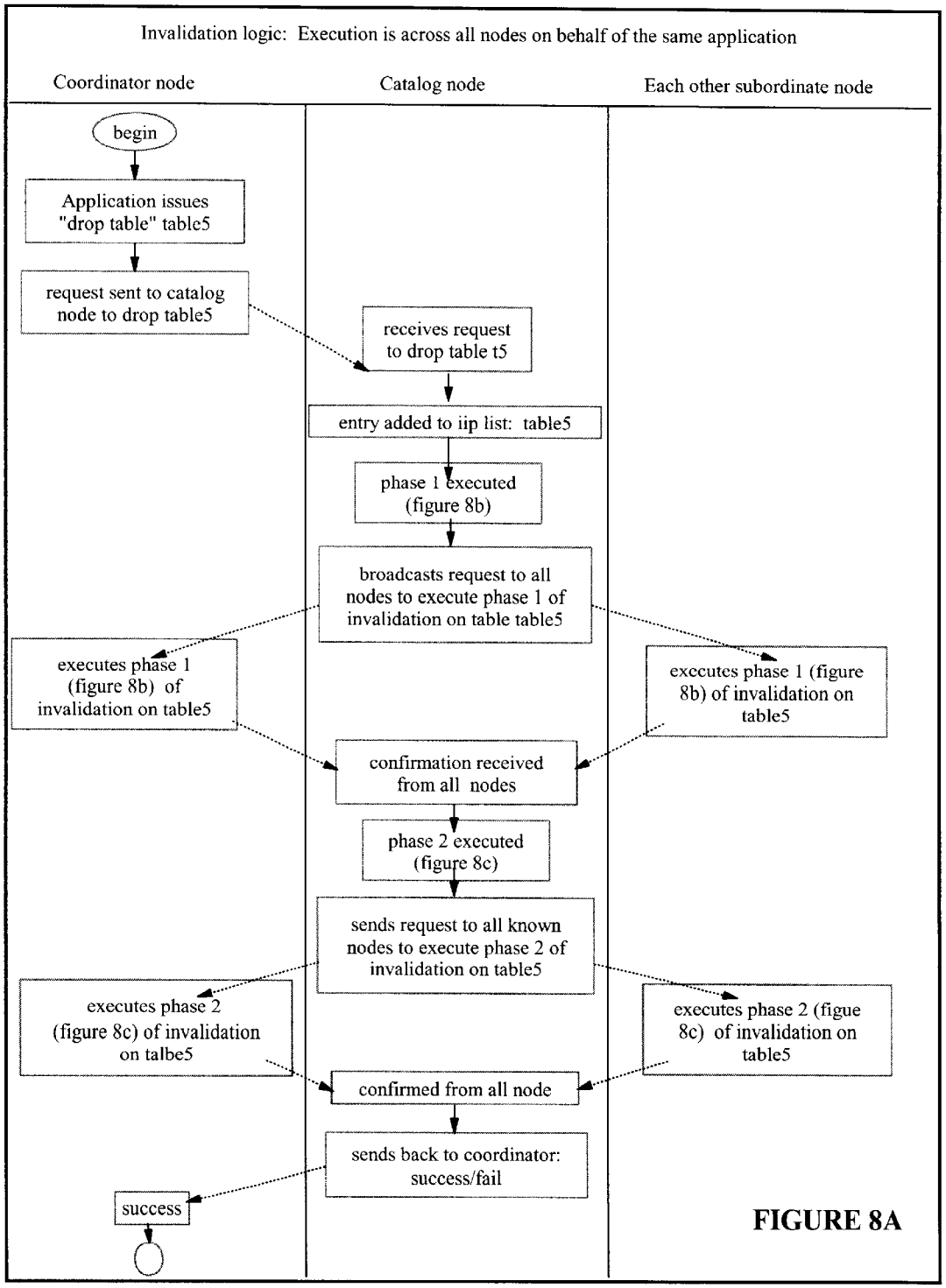
FIGS. 8A, 8B, and 8C depict a flow chart for a multi-node database management system in accordance with an embodiment of the present invention.
Figure 8B:
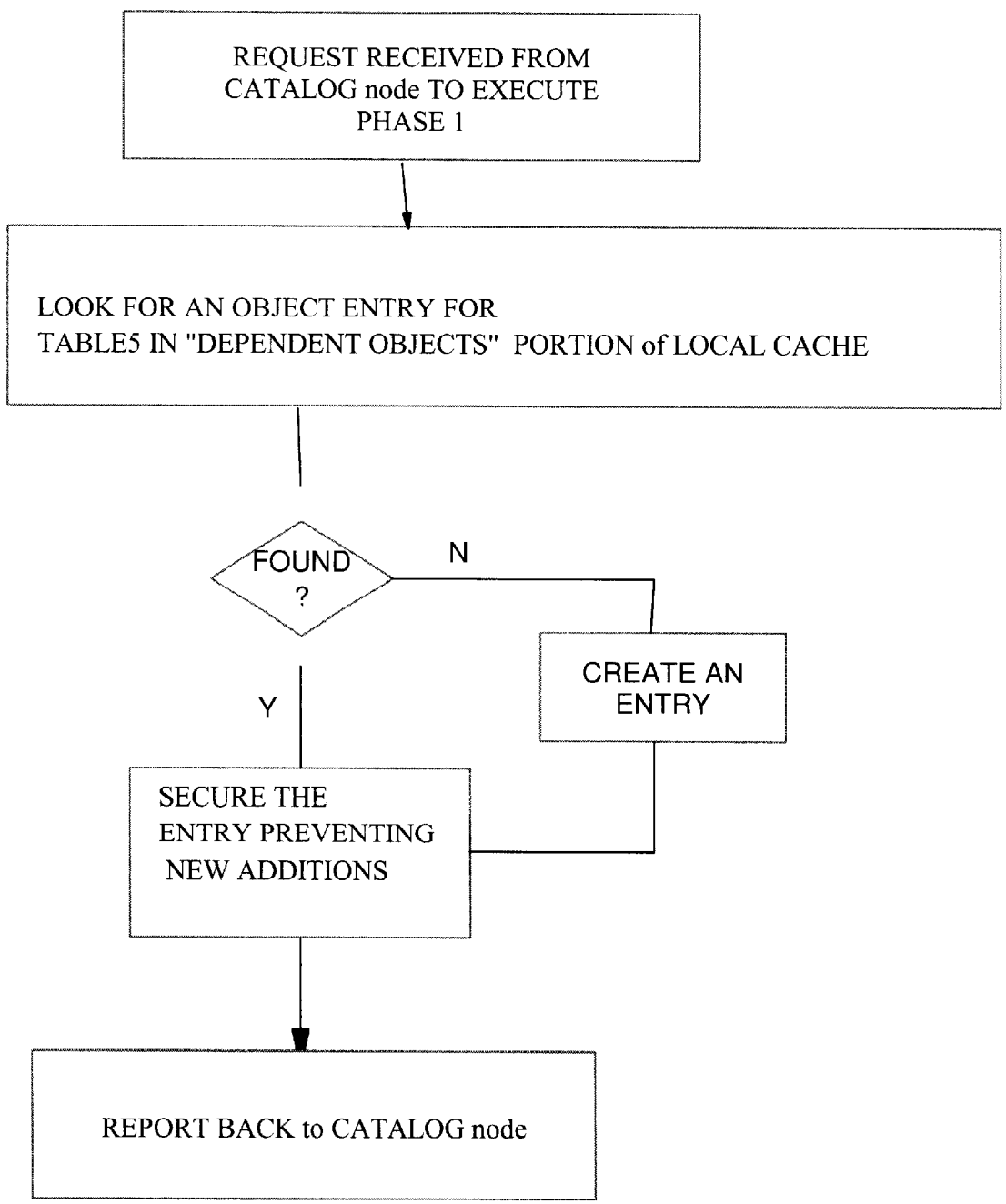
Figure 8C:
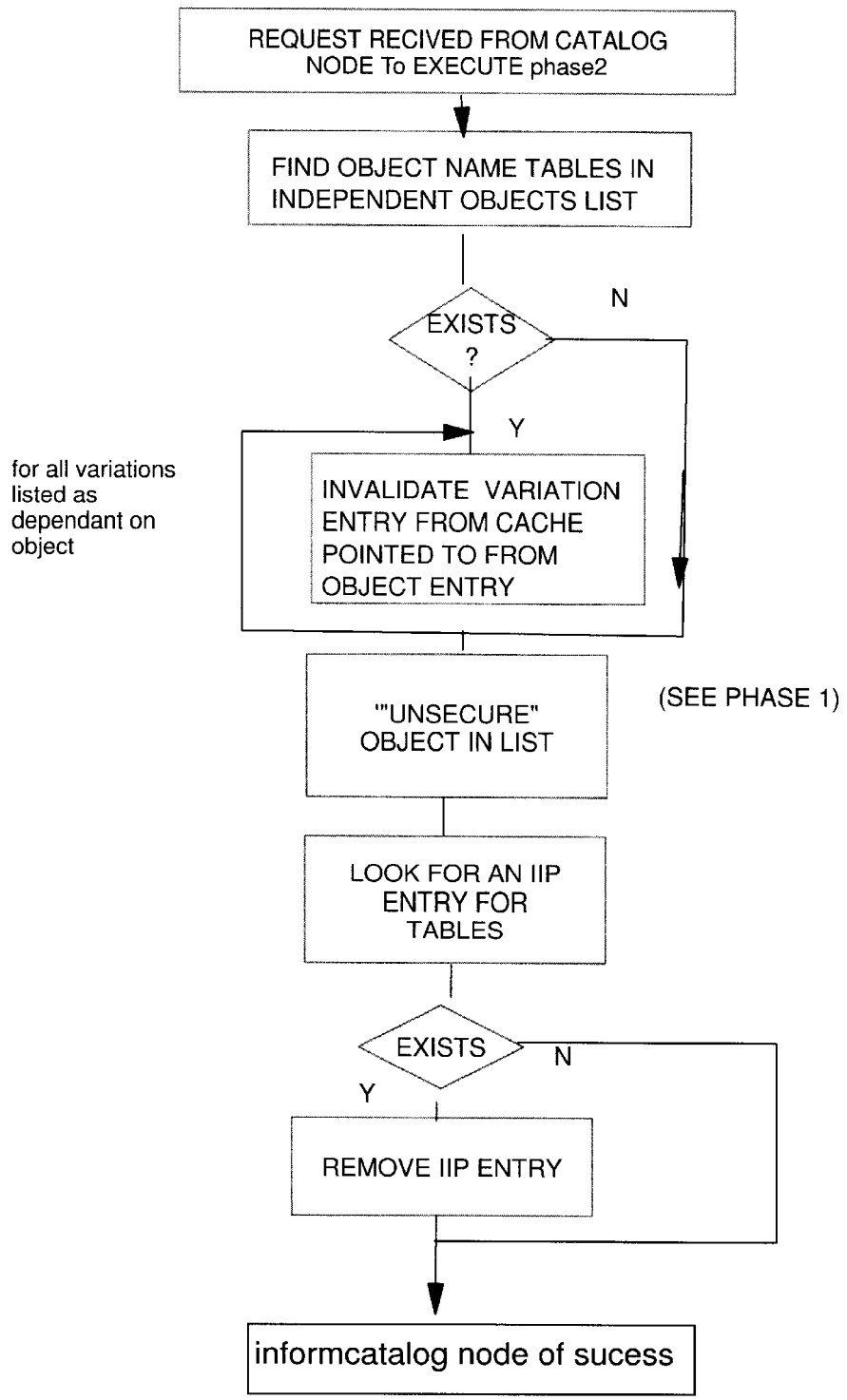

FIGS. 8A, 8B, and 8C describe the general method for a multi-node invalidation that ensures that entries that should be invalid to not end up at any subordinate node, in which case sharing would then allow a new application at that node to run from an invalid variation and its section.

Referring to FIG. 8A, in this method, two separate broadcasts occur, the second of which does not complete until the first has completed successfully on all nodes. We consider generally a request originating at a node that is not necessarily the catalog node, to modify (in the example of FIG. 8A—dropping) an object. This request, since it involves a change in the definition of the object which is maintained in the catalog tables at the catalog node, is forwarded to the catalog node to control. At the catalog node, the request is received to modify/drop a specific object. When this happens a new entry is added to the invalidations in progress portion 44 of the cache (up list in FIG. 2), which indicates the object type, object name, as well as a unique identifier. (The purpose of this entry in the invalidations in progress list is discussed in the context of a modified node startup algorithm below.) Then phase 1 is executed at the catalog node and then a broadcast is issued to all nodes to execute phase 1 of the invalidation. Phase 1 (FIG. 8B) does not involve the active marking of variations as invalid. Instead it is performed to ensure that newly shipped variations that are dependent on the object that is being modified are immediately marked as invalid when being placed in the shipped-to node's cache. At each node in phase 1, this is done by searching in the dependency portion of the cache for an object entry that matches the object type and object name of the object being modified or dropped. If an entry does not exist, a new entry is created. At this entry the object is marked as "secured." Once marked as secured, any new insertions of variations shipped from other nodes that attempt to insert a dependency entry (for the newly shipped variation) for the object being modified/dropped will note that the entry is secured, and will immediately mark the variation entry as invalid. Once the object entry in the dependency portion 42 of the cache is marked as secured, phase 1 is complete and control returns to the catalog node.

Once all nodes have completed phase 1, the DBMS then executes phase 2 of the invalidation—first locally at the catalog node, and then a broadcast request is sent to all nodes to execute phase 2 of invalidation for modifying/dropping a specific object.

In phase 2 (FIG. 8C), a search is performed in the dependency portion of the cache for the object that matches the name and the type of the object being modified. (This object entry should have been already marked as secured during the first phase.) Once this object has been located, all dependent variations, the list of which is maintained at the object entry, are marked as invalid in the statement portion of the cache. The invalidations in progress list is then searched for a matching object name and type. If one exists, it is dropped. Once this has been completed, the object entry in the dependency portion of the cache is then marked as not secured, and the second phase is complete. When the catalogue node is informed of the success of all second phases from all nodes, the object definition modification can then proceed.

In this 2 phase algorithm, the first phase has thus insured that the second phase can occur without regard for new shipping of variations that may occur while the second phase takes place, and thus ensures that all variations that should be marked as invalid are marked as invalid at all nodes of the system.

However this 2 phase algorithm alone still does not ensure that the invalidation is completely impervious to improperly marked variations. This is because the broadcast events only occur from the catalog node to all nodes that have been the catalog node recognizes; and those are only the nodes that have been registered (as described above). However, not all nodes of a system need to be active all the time, thus it is possible to have a new node start up and be added to the list of registered node in between the first two phases of the invalidation. In this case, the first phase which secured the objects until the second phase would not be performed at that node, thus re-opening the possibility that shipping a variation may end up missing the invalidation process and ending up on a shipped-to node marked as valid when it should be invalid. This scenario is illustrated by example in the following example, where for simplicity we have assumed that the "drop table" request is issued at node 0, which is the catalog:

| Node 0 - catalogue node | Node 1 | Node 2 |
|---|---|---|
| B: Application issues "DROP table T1". The DBMS sends phase 1 of | A: Application issues: "INSERT into T1 values 1, 2, 3"; compiled and executable |  NODE INACTIVE *<br> NODE INACTIVE * |

-continued

| Node 0 - catalogue node | Node 1 | Node 2 |
|---|---|---|
| invalidation request to all nodes to invalidate all SQL dependent on T1. At this point it only recognizes node 1 as a node to broadcast to, since node 2 is inactive. Node 2 is registered at catalogue node<br>B: phase 2 of invalidation sent to all nodes. It now recognizes node and node 2 as nodes to send a broadcast to<br>B: Receives notice that all nodes have finished invalidating and drops the table | inserted into cache at node 1 with ID = xx. This executable is executed on this node and a request is sent to node 2 to execute ID = xx from node 1<br>B: Receives Phase 1 invalidation received from node 0. No new SQL dependent on T1 will be allowed on this node<br>B: Receives Phase 2 invalidation request from node 0. request to invalidate all SQL dependent on T1 - has to wait behind application A to finish executing the INSERT on all nodes before it can remove entry xx<br>A: receives notice that node 2 has completed, frees up the xx entry in the cache for deletion.<br>B: now that A has finished, it deletes the entry for the INSERT |  NODE INACTIVE *<br> NODE INACTIVE *<br> NODE INACTIVE *<br> NODE INACTIVE *<br> NODE INACTIVE *<br>Node starts up to handle new application request<br> NODE INACTIVE *<br> NODE INACTIVE *<br> NODE INACTIVE *<br> NODE INACTIVE *<br> NODE INACTIVE *<br>B: Receives phase 2 invalidation Request from node 0. However no object entry for T1 is found.<br>A: receives request to execute xx from node 1. This starts up the node. A copy of xx is shipped over from node 1 and inserts into cache at node 2 the entry for "INSERT into T1 values 1, 2, 3". Executes and informs Node 1 that it has done.<br>C: "INSERT into T1 values 1, 2, 3". An entry for this is found in the cache from when app A shipped it over from node 1 and seems to be valid. Danger!!! |

In the example the 'securing' aspect of phase 1 of invalidation is missed by the node that has just started up. In order to ensure that the securing can occur on this node without the benefit of the first phase of the invalidation, the node registering process is enhanced whereby when a new node registering is made aware of invalidations that are in progress. This is described in FIG. 9. When a new node starts up, it sends a request to the catalog node to register itself as a 'participating node'. The catalog node adds this node to its list of participating nodes, and then sends to this new node the list of all the current invalidations in progress entries from the invalidations in progress portion of the cache. The new node receives this list, and sets up on its node's cache and invalidations in progress list. For each of the entries therein, (each of which indicate the object name and type of an object being modified) a new entry in the dependency is created for that object and the object is secured as it would have been if phase 1 of the invalidation were to have been received on that node. Note that this algorithm relies on some of the elements described already for the 2 phase invalidation in FIG. 8, that is, the catalog node adds a new entry to the invalidations in progress list before even executing phase 1; also at the end of phase 2 every node examines the invalidations in progress for a matching entry for the object being modified—if found the entry is deleted.

In this way the new node when starting up has mimicked phase 1 of the invalidation by securing object entries to ensure new shipped insertions in the statement portion of the cache are aware whether they need to be marked invalid.

Pseudocode

The pseudocode listed below when read in configuration with the description above and the drawings should assist those skilled in the art in appreciating the present invention.
Part I
Modules A–C are the pseudo code associated with running an SQL request/query in a multi-node environment Accompanying FIGS. 7*a–c*.

Module A) Pseudocode for SQL request: coordinator node—part I):

The following code is run by the DBMS coordinator agent on behalf of an application that issues an SQL request against a database:

1) search statement part of dynamic SQL cache for matching statement entry
2) if (matching statement entry not found)
   2.1) Create new statement entry containing the statement text of the SQL request issued by application
   2.2) Insert new statement entry into statement part of the cache
   2) end if
3) search statement entry for a matching environment entry
4) if (matching environment entry not found)
   4.1) Create new environment entry containing environment in which the SQL request was issued
   4.2) Insert new environment entry into cache as an environment of the matching statement
4) end if
5) search environment entry for a variation entry with a valid executable
6) if (valid variation entry not found)
   6.1) Compile SQL request (supplying the statement, environment)
   6.2) Create new variation entry containing:
      6.2.1) compiled section (executable)
      6.2.2) privilege information
      6.2.3) dependent objects
      6.2.4) new variation id unique to this (coordinator) node's cache.
   6.3) Insert new variation entry into cache as a valid variation of the matching environment.
      6.3.1) For each dependent object in dependency list (step 6.2.3)
      6.3.1.2) Search in dependency portion of cache for a matching object entry (matching that in 6.3.1)

6.3.1.3) If (matching object entry not found)
    6.3.1.3.1) Create new object entry in the dependency portion of the cache identifying the object (in 6.3.1)
    6.3.1.3.2) Insert new object entry into cache
6.3.1.3) end if
6.3.1.4) Create new dependent variation entry identifying the variation (6.2)
6.3.1.5) Insert new dependent variation entry into dependency portion of cache as a dependent variation entry of the object entry
6.3.1) end for
6) end if (at this point the desired variation exists in the cache with a unique id)
7) Determine from the section/executable which nodes are the subordinate nodes
8) if (variation entry has a entry in the shipped variation list)
    8.1) original node id=original node id in the shipped variation list entry
    8.2) original variation id=original variation id in the shipped variation list entry
8) else
    8.3) original node id=current (coordinator) node
    8.4) original variation id=id of variation at current (coordinator) node (6)
8) end if
9) Send request to all subordinate nodes to run a section from a variation identified by:
    local node id=current (coordinator) node
    local variation id=id of variation at current (coordinator) node (6)
    original node id (step 8)
    original variation id (step 8)
10) Executes from the section in the variation at the coordinator
11) Wait for execution from all subordinate nodes to complete, and results received from all nodes.
12) Return result to application
13) exit Note steps 1–10 are in the first column of FIG. 7a), steps 11–13 are in the first column of FIG. 7c)

Module B) Pseudocode for SQL request coordinator node— part II)

The following logic is run by the another DBMS agent at the coordinator node as a response to a subordinate node request to ship a variation from the coordinator node over to that subordinate node (Module C, step 3.5.1):

1) request is received from subordinate node to ship a variation of a particular id
2) statement part of cache is searched for a variation of the requested id (1) (will be found)
3) package together into one 'delivery', the variation entry with all its subcomponents, the parent environment entry of that variation, and the parent statement entry of the variation and environment
4) send the delivery back to requesting subordinate node
5) exit.

All steps of B) are on the first column of FIG. 7b) at coordinator node

Module C) Pseudocode for SQL request at subordinate node

The following logic is run a DBMS agent on the subordinate node in response to a request of step 9) in module A to execute a specific variation's section:

1) request received from coordinator node to all subordinate nodes to run a section from a variation identified by:
    local node id—this is coordinator node id
    local variation id—this is the variation entry id at the coordinator
    original node id
    original variation id
2) Search shipped variation portion of dynamic cache for entry matching the original node id, original variation id
3) if (matching shipped variation entry found)
    3.1) The variation entry in the statement part of the cache that is associated the shipped entry is the desired variation whose section is to be run.
3) else
    3.2) create new shipped variation entry with original node id and original variation id as supplied (1)
    3.3) insert new shipped variation entry in the shipped variation portion of cache (currently not associated with any variation in local (subordinate) cache)
    3.4) if the original node id (step 1) same as the current (subordinate) node's id
    3.4.1) Search for the original node variation id in the current (subordinate node's cache)
    3.4.2) if variation entry is found in the cache with a matching id as the original node variation id
        3.4.3) Associate the new shipped variation entry (3.2) with the matching variation
        (3.4.2). This is the desired section to be run.
    3.4) end if
    3.5) If the new shipped variation is still not associated with any local variation entry
        3.5.1) Send request to coordinator node (as identified as local node id in step 1) to ship local variation id (1). (This request is handled at the coordinator node by Module B)
        3.5.2) Receive variation information, as well as matching statement and environment entry from coordinator node
        3.5.3) Create and insert new variation entry (and if necessary statement, environment entries) in statement portion of local cache
        The steps for inserting the new variation are similar to steps 2–6 in Module A with the following exceptions:
            3.5.3.1) If a matching statement/environment entry already exists and a valid variation for that statement/environment is already present in the cache (Module A, step 6), that variation is marked as invalid; a new variation entry is always inserted
            3.5.3.2) The variation is not compiled at the local node (as in Module A step 6.1), rather the variation info obtained from the shipment from the coordinator node is used to fill in the new var; this includes info in Module A, 6.2.1, 6.2.2, 6.2.3. (the section, the privileges information and the dependency information). The variation id, however is a new variation id for this variation, chosen to be unique at the subordinate node.
            3.5.3.3) When inserting entries in the dependency portion of the subordinate node's cache (Module A, steps 6.3.1) an additional check is performed (which would take place after 6.3.1.5 in the Module A)

3.5.3.3.1) If object entry is marked as secured, then mark the new variation entry as invalid 3.5.4) Associate created shipped variation entry (3.2) with newly created variation (3.5.3).

This is the variation with the required section/executable.

3) end if 4) run from section from the indicated variation 5) send results back to coordinator node (received in Module A) step 11)

6) exit

Note all of Module C is in the second column of FIGS. 7b and 7c.

Part 2

Modules D)–I) are associated with Invalidation logic in a multi-node system

Module D) Pseudocode for Invalidation—Coordinator node

1) Request received from an application to change the definition of an SQL object or to drop the object itself.

2) If the coordinator node is the catalog node
   2.1) Execute Module E)

2) else
   2.2) Request is send to the catalog node to execute the request
   2.3) Waits for reply from catalog node 2) end if 3) Returns result of execution at the catalog node to the application 4) exit;

The following code is run by the DBMS coordinator agent on behalf of an application that issues a request to change the definition (or drop the existence) of an SQL object:

Note all of Module D is in the first column of FIG. 8a

Module E) Pseudocode for Invalidation—Catalog node

The following logic is run a DBMS agent on the catalog node in response to a request from the coordinator node to change the definition of an SQL object:

1) Request received from the coordinator to drop or modify the definition of an SQL object 2) Add an entry to the invalidations in progress list identifying the object name and object type 3) execute Phase 1 of the invalidation (Module F) at this (catalog) node, specifying the object name and object type in question (1)

4) Broadcast request to all other known nodes to execute Phase 1 (Module F) of the invalidation 5) Wait for response from all other known nodes 6) If (confirmation received from all nodes that phase 1 is successful)
   6.1) Execute phase 2 of the invalidation (Module G) at this (catalog) node, specifying the object name and object type in question (1)
   6.2) Broadcast request to all other known nodes to execute Phase 2 (Module G) of the invalidation. (Note all the known nodes may not be the same list of known nodes as in the Phase 1 broadcast in 4)).
   6.2) Wait for response from all other known nodes 6) end if 7) If phase 1 and phase 2 are successful
   7.1) drop the object or modify the object in the catalogs as requested 8) Return success/fail information to coordinating node Note all of Module E is in the second column of FIG. 8a Module F) Pseudocode for Invalidation—Phase 1 at all nodes 1) Request received from catalog node to execute phase 1 of invalidation for an object, identified by its name, and object type 2) Search dependency portion of cache for an object entry that matches the name, type identified in 1)

3) If object entry does not exists in the dependency portion of the cache
   3.1) Create an object entry with the name, type identification from 1)

3) end if

3) Denote in the object entry that the entry has been secured.

4) Send success/fail information back to catalog node 5) exit;

Note all of Module F is in FIG. 8b

Module G) Pseudocode for Invalidation—Phase 2 at all nodes

1) Request received from catalog node to execute phase 2 of invalidation for an object, identified by its name, and object type 2) Search object entry in dependency portion of cache that matches the name, type identified in 1)

3) If object entry exists in the dependency portion of the cache
   3.1) For all dependent variation entry listed for the object entry in the dependency portion of the cache
      3.1.1) find the variation entry in the statement portion of the cache (variation is indicated in the dependent variation entry).
      3.1.2) Wait until no other DBMS agents operating on this node is using the variation
      3.1.3) Mark the variation entry as invalid
   3.1) end for
   3.2) Denote in the object entry that the entry is no longer secured
   3.3) Search the invalidations in progress portion of the cache for an entry matching the object name, object type indicated in 1)
   3.4) If matching entry is found
   3.5) Delete the invalidations in progress entry
   3.4) end if 3) end if 4) exit Note all of Module G is in FIG. 8b Module H) Pseudocode for node start up logic—New node The following code is run by an agent of the DBMS at the new node starting up before it acts on any other requests. Any request is received at the new node that until the point is currently inactive; in order to allow the node to activate the following is performed:

1) A request is sent to the catalog node to register this new node. (Module I at the catalog node)

2) The reply from the catalog node is received together with a list of invalidations in progress 3) All entries of invalidations in progress received are created identically at the new node 4) For all entries in the invalidations in progress list
   4.1) add a new object entry in the dependency portion of the cache with the object name, type matching that indicated in the invalidations in progress entry
   4.2) Denote in the object entry that the entry has been secured.

4) end for 5) exit

Figure 9:
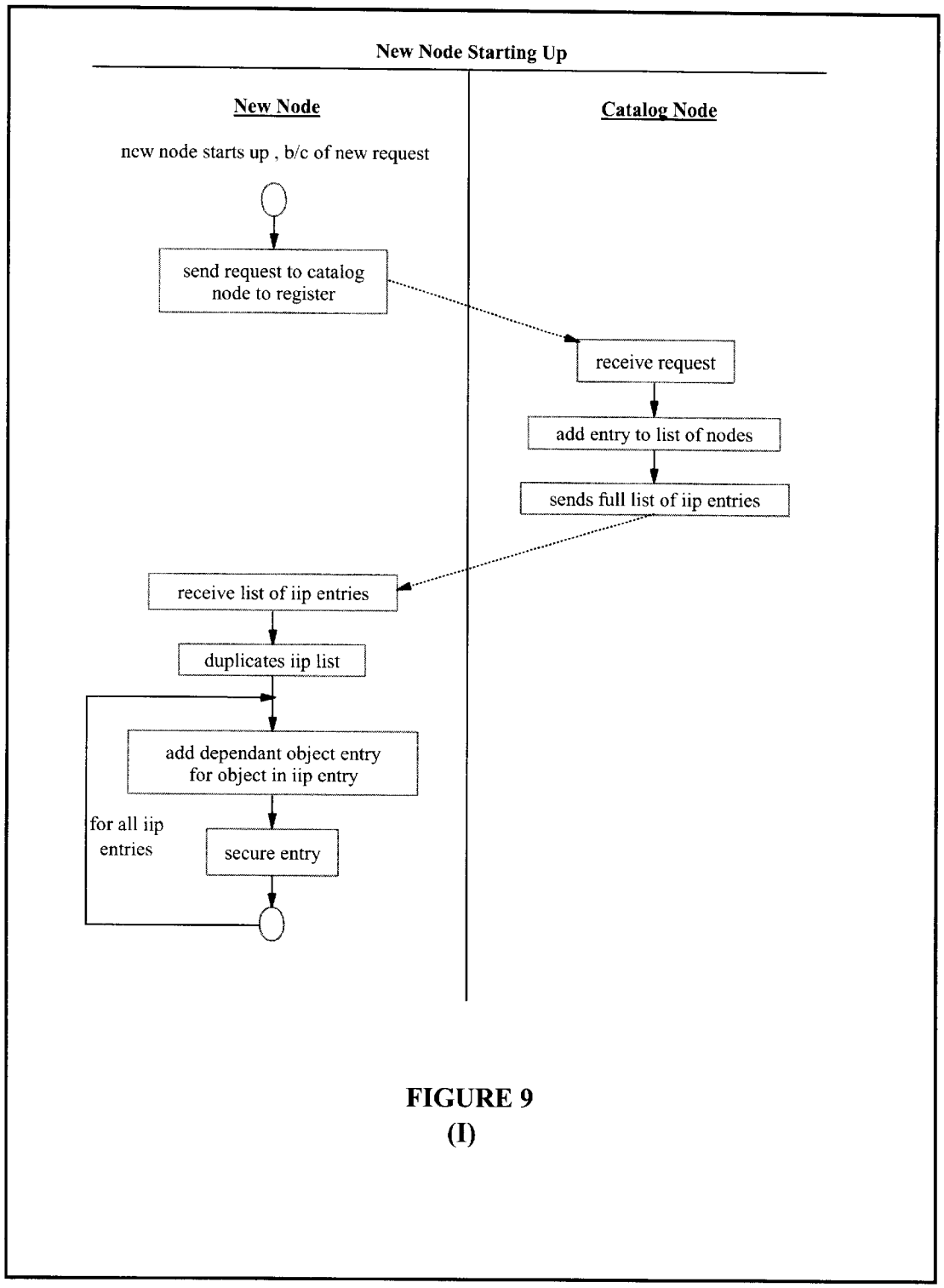
FIG. 9 depicts a flow chart of a new node registering with a database management system in accordance with the invention.

Note all of Module H is in the second column of FIG. 9.

The embodiments of the invention in which an exclusive property or privilege is claimed are defined as follows:

1. A data processing system comprising:
   a plurality of nodes, at least one data partition residing on at least one of said nodes and having one or more tables residing in a data partition;
   one of said nodes having a catalogue containing metadata describing tables and other objects and relationships therebetween in said data processing system;
   a global instruction cache at each node having a statement portion storing instruction statements and associated executables;
   each said executable being designed for a particular environment;
   said instruction cache including a dependency portion which lists objects and links them to said corresponding executable entries that depend on said objects;
   said instruction cache including a shipped variation portion, wherein each entry of said shipped variation portion refers to one executable entry and identifies said node from which said statement associated with said executable was originally shipped and said identification of such executable in said node from which it was originally shipped;
   said cache including an invalidations in progress portion, wherein each entry of said invalidations in progress portion which refers to an object entry in said dependency portion.

2. The data processing system of claim 1 wherein:
   a catalogue node has a catalogue containing metadata describing tables and other SQL objects and relationships therebetween in said data processing system;
   wherein said SQL objects may include tables views of tables, aliases of tables, functions, and user defined types among others;
   a global SQL instruction cache at each node having a statement portion storing dynamic SQL statements and associated executables;
   each said executable being designed for a particular environment;
   said SQL cache includes a dependency portion which lists SQL objects and links them to said corresponding executable entries that depend on said objects;
   said SQL cache includes a shipped variation portion, each entry of said shipped variation portion refers to one executable entry and identifies said node at which said SQL statement associated with said executable was originally compiled and shipped from and identification of such executable in said node at which it was compiled and shipped from;
   said SQL cache includes an invalidations in progress portion, each entry of said invalidations in progress portion refers to an object entry in said dependency portion.

3. The data processing system of claim 2 wherein said global SQL instruction cache includes a statement entry which includes:
   SQL instruction statement text and a list of associated environment entries;
   each said environment entry includes a description of said environment and a list of variations, each said variation includes:
      an identification number;
      the executable itself;
      a list of required privileges;
      a reference available to the entry in the shipped variation list portion of said cache.

4. The data processing system of claim 1 wherein:
   a catalogue node has a catalogue containing metadata describing tables and other SQL objects and relationships therebetween in said data processing system;
   wherein said SQL objects may include tables views of tables, aliases of tables, functions, and user defined types among others.

5. The data processing system of claim 1, wherein said global instruction caches further comprise a global SQL instruction cache at each node having a statement portion storing dynamic SQL statements and associated executables, each said executable being designed for a particular environment.

6. The data processing system of claim 1, wherein said global instruction cache includes a dependency portion which lists objects and links them to said corresponding executable entries that depend on said objects.

7. The data processing system of claim 1 wherein said global instruction cache includes a statement entry which includes:
   instruction statement text and a list of associated environment entries;
   each said environment entry includes a description of said environment and a list of variations, each said variation includes:
      an identification number;
      the executable itself;
      a list of required privileges;
      a reference available to the entry in the shipped variation list portion of said cache.

8. A method of executing an SQL request issued by an application from a node (a coordinator node) in a data processing system having a plurality of nodes managed by a database management system, comprising the steps of:
   searching in a global SQL cache at said coordinator node for an executable that is associated with an SQL statement and environment corresponding to said SQL request;
   if said executable is not found in said global cache then said database management system compiling said SQL request at said coordinator node then inserting an executable entry into said global cache at said coordinator node;
   searching at said coordinator node in said global SQL cache for an SQL statement entry, the text of which matches the text of said SQL request;
   if said entry is not present at said coordinator node, inserting, by said database management system, a new SQL statement entry, the text of which matches said SQL request;
   if said entry is present then said database management system searching for environment entries associated with said SQL statement entry for an environment entry that matches the environment for which the SQL request was issued;
   if said environment entry is not present then said database management system inserting into said cache a new environment entry matching the environment of said SQL request;
   said database management system searching for a variation entry comprising a valid executable corresponding to said SQL request, which includes the SQL statement and environment entry, and, if a valid executable is not found then said database management system compiling said SQL request, referring to the appropriate environment, into an executable (a set of one or more executable instructions) to carry out said SQL request;

inserting into a variation entry said compiled executable, including a list of required privileges, a list of dependent objects, an identification number of said variation entry, and identification of the validity of said entry; and for each object in said list of dependent objects searching in the dependency portion of said global SQL cache for an object entry with a matching object name and object type, and if it does not exist in said cache, inserting a new entry.

9. A method of identifying an executable in a data processing system having a plurality of nodes at which processing may be performed, comprising the step of:

identifying said executable by node identification and entry identification associated with the first node of said data processing system that shipped said executable to any other node in said data processing system.

10. The method of claim 9 wherein said executable is identified by node and entry identification associated with the first node of said data processing system that compiled and shipped said executable to any other node in said data processing system.

11. A method of indexing data and instructions for storage and retrieval in a data processing system having a plurality of nodes, comprising:

storing identification of said data and instructions in a list wherein said data and instructions are identified by node identification and entry identification associated with the first node that shipped said data and instructions to any other node.

12. The method of claim 11 wherein said node list comprises an entry portion and a lookup portion wherein:

said entry portion stores the following:
SQL statements;
executables;
environment parameters;
entry identification for that entry in said list; and, wherein said lookup portion includes the following:
said entry identification;
the identification of the node that first shipped or compiled said executable;
entry identification of said executable at the node that first shipped or compiled the executable.

13. A method of executing a data processing request from a node (the coordinator node) in a manner adapted to avoid redundant shipping of executables, in a database system having a plurality of interconnected nodes managed by a database management system, each of said nodes having an unique identification, said nodes being capable of storing or processing information, each node having a cache, said cache having a statement portion and a shipped variation portion, said statement portion of said cache at each node for storing SQL statements, executables associated with said SQL statements, and environments with which said executables are associated, wherein said executables are each identified by an unique entry identification, said shipped variation portion (list) for storing identification entries for said executables including:

identification (ID number) of the executable which corresponds to the identification (ID number) of the associated entry in said statement portion of said cache;

the node identification (ID number) of the node from which said executable was originally shipped from or compiled; and, the identification (ID number) of the executable at said node from which said executable was first shipped;

the method comprising the steps of:
finding a suitable executable for carrying out the request by:
searching said statement portion of said cache at the coordinating node for an executable that is associated matching said request and environment in which said request was issued; and,
if said matching statement and environment were not found in said statement portion of said cache of said coordinating node, then compiling said request and inserting said request into said cache;
sending a request to all other nodes of said data base management system that are necessary to process said request (subordinate nodes of said coordinating node) wherein said request to all other such nodes includes:
the identification of said coordinator node and the entry identification of said executable, and
if there is a entry in said shipped variation list associated with said executable on said coordinator node cache then said database management system also shipping identification of said node and entry.

14. A method of executing a request by an application at a first node in a database system having a plurality of nodes, and being managed by a database management system, each node having a storage cache for indexing and storing instructions including statements, executables and environment information, comprising the steps of:

said application identifying the executable that is desired to be executed, searching at said first node for said executable, and, if said executable is not found at said node compiling said executable, then, using identification of said node by the node and entry identification of said executable on the node from which it was first shipped or compiled, requesting execution by all other nodes required for executing said executable;

said other nodes searching in their respective caches by the node and entry identification of said executable assigned by the node from which it was initially shipped or compiled; and, if said executable is found at each said other node executing it at each node at which it is found; and, if it is not found at one or more of said other nodes requesting that said executable be shipped from said first node to said nodes where said executable was not found; and, then executing said executable at each of said other nodes receiving it.

15. A method of performing data processing in a multi-node data processing system by sharing dynamic compiled (SQL) executable data processing statements between nodes of said data processing system comprising the steps of:

identifying each compiled SQL statement with a numerical identifier;

at a node receiving statements (a receiving node) storing a list of statements received at said receiving node listing the originating node and identifier for each of said received statements;

upon receiving a request for processing with a specified statement having said receiving node check its list of statements received for the specified statement by its
originating node and identifier;

comparing the identification of said specified statement
with said statements in said list of said receiving node,
and if a match if found then accessing said statement
stored at said receiving node;

if a match is not found, having said receiving node request
the specified statement from another node, and when it
is received then loading it into its local cache;

having said receiving node update its list of statements;
and executing said statement at said receiving node.

16. A method for updating entries in a cache a method of updating entries in said cache at one or more nodes in a database management system having a plurality of interconnected notes when object definition entries in a catalogue are changed, each of said nodes having an unique identification, said nodes being capable of storing or processing information, one of said nodes comprising a catalogue node having metadata describing tables and other SQL objects and relationships between them in the data processing system;

each node having a cache, said cache having a statement portion and a dependency portion;

said statement portion of said cache at each node for storing SQL statements, executables associated with said SQL statements, and environments with which said executables are associated, wherein said executables are each identified by an unique entry identification;

said dependency portion for storing object entries for said SQL objects including:

identification of the object which corresponds to the object name and object type;

a list of entries referring to executable entries in the statement portion of the cache whose execution relies on the definition and existence of said object;

comprising the steps of:

updating said catalogue node by removing all invalid entries and broadcasting instructions to other known nodes of system to remove invalid entries from their respective caches, by:

making a first broadcast of instructions to said nodes to secure object entries in the dependency portion of each cache by first:

finding an object entry associated with the object that is being changed in the dependency portion of the cache;

if such an object entry in the dependency portion of the cache is not found, inserting a new object entry;

securing said object entry in the dependency portion of caches of said other nodes; marking all the executables currently listed as being associated with the said object as invalid;

reporting to said database management system at the catalog node that the object entry in each of said caches have been marked as secured;

examining any executable newly arriving in a cache of a node and determining if it depends on an object that has been secured, and if so, marking it as invalid;

making a second broadcast from the catalog node to all known nodes to:

mark all entries in said caches which are dependent on a secured object or an invalid object as being invalid; and, removing the secured marking of all secured objects;

removing all invalid entries and objects.

17. The method of claim 16, further comprising the step of updating entries in said cache at each node when a node is added to said database, said updating step further comprising the steps of:

when a new node is added to the database system, sending from said catalogue node a list of all secured objects to said new node;

at said new node, for all the objects in the list of said objects secured at the catalog node, creating and securing a new object entry in the dependency portion of the cache of said new node;

at said new node, examining any executable newly arriving in the cache of said new node and determining if said executable depends on an object that has been secured, and if so, marking it as invalid.

18. A computer program product comprising computer readable storage for storing statements or instructions for use in executing on in a computer a method of executing an SQL request issued by an application from a node (a coordinator node) in a data processing system having a plurality of nodes managed by a database management system, comprising the steps of:

searching in a global SQL cache at said coordinator node for an executable that is associated with an SQL statement and environment corresponding to said SQL request;

if said executable is not found in said global cache then said database management system compiling said SQL request at said coordinator node then inserting an executable entry into said global cache at said coordinator node;

searching at said coordinator node in said global SQL cache for an SQL statement entry, the text of which matches the text of said SQL request;

if said entry is not present at said coordinator node, inserting, by said database management system, a new SQL statement entry, the text of which matches said SQL request;

if said entry is present then said database management system searching for environment entries associated with said SQL statement entry for an environment entry that matches the environment for which the SQL request was issued;

if said environment entry is not present then said database management system inserting into said cache a new environment entry matching the environment of said SQL request;

said database management system searching for a variation entry comprising a valid executable corresponding to said SQL request, which includes the SQL statement and environment entry, and, if a valid executable is not found then said database management system compiling said SQL request, referring to the appropriate environment, into an executable (a set of one or more executable instructions) to carry out said SQL request;

inserting into a variation entry said compiled executable, including a list of required privileges, a list of dependent objects, an identification number of said variation entry, and identification of the validity of said entry; and for each object in said list of dependent objects searching in the dependency portion of said global SQL cache for an object entry with a matching object name and object type, and if it does not exist in said cache, inserting a new entry.

19. A computer program product comprising computer readable storage for storing statements or instructions for use in executing on in a computer a method of identifying an executable in a data processing system having a plurality of nodes at which processing may be performed, comprising the step of:

identifying said executable by node identification and entry identification associated with the first node of said data processing system that shipped said executable to any other node in said data processing system.

20. The method of claim 19 wherein said executable is identified by node and entry identification associated with the first node of said data processing system that compiled and shipped said executable to any other node in said data processing system.

21. A computer program product comprising computer readable storage for storing statements or instructions for use in executing on in a computer a method of indexing data and instructions for storage and retrieval in a data processing system having a plurality of nodes, comprising:

storing identification of said data and instructions in a list wherein said data and instructions are identified by node identification and entry identification associated with the first node that shipped said data and instructions to any other node.

22. The method of claim 21 wherein said node list comprises an entry portion and a lookup portion wherein:

said entry portion stores the following:
SQL statements;
executables;
environment parameters;
entry identification for that entry in said list; and, wherein said lookup portion includes the following:
said entry identification;
the identification of the node that first shipped or compiled said executable;
entry identification of said executable at the node that first shipped or compiled the executable.

23. A computer program product comprising computer readable storage for storing statements or instructions for use in executing on in a computer a method of executing a data processing request from a node (the coordinator node) in a manner adapted to avoid redundant shipping of executables, in a database system having a plurality of interconnected nodes managed by a database management system, each of said nodes having an unique identification, said nodes being capable of storing or processing information, each node having a cache, said cache having a statement portion and a shipped variation portion, said statement portion of said cache at each node for storing SQL statements, executables associated with said SQL statements, and environments with which said executables are associated, wherein said executables are each identified by an unique entry identification, said shipped variation portion (list) for storing identification entries for said executables including:

identification (ID number) of the executable which corresponds to the identification (ID number) of the associated entry in said statement portion of said cache;
the node identification (ID number) of the node from which said executable was originally shipped from or compiled; and,
the identification (ID number) of the executable at said node from which said executable was first shipped;

the method comprising the steps of:
finding a suitable executable for carrying out the request by:
searching said statement portion of said cache at the coordinating node for an executable that is associated matching said request and environment in which said request was issued; and,
if said matching statement and environment were not found in said statement portion of said cache of said coordinating node, then compiling said request and inserting said request into said cache;
sending a request to all other nodes of said data base management system that are necessary to process said request (subordinate nodes of said coordinating node) wherein said request to all other such nodes includes:
the identification of said coordinator node and the entry identification of said executable, and
if there is a entry in said shipped variation list associated with said executable on said coordinator node cache then said database management system also shipping identification of said node and entry.

24. A computer program product comprising computer readable storage for storing statements or instructions for use in executing on in a computer a method of executing a request by an application at a first node in a database system having a plurality of nodes, and being managed by a database management system, each node having a storage cache for indexing and storing instructions including statements, executables and environment information, comprising the steps of:

said application identifying the executable that is desired to be executed, searching at said first node for said executable, and, if said executable is not found at said node compiling said executable, then, using identification of said node by the node and entry identification of said executable on the node from which it was first shipped or compiled, requesting execution by all other nodes required for executing said executable;
said other nodes searching in their respective caches by the node and entry identification of said executable assigned by the node from which it was initially shipped or compiled; and,
if said executable is found at each said other node executing it at each node at which it is found; and,
if it is not found at one or more of said other nodes requesting that said executable be shipped from said first node to said nodes where said executable was not found; and,
then executing said executable at each of said other nodes receiving it.

25. A computer program product comprising computer readable storage for storing statements or instructions for use in executing on in a computer a method of performing data processing in a multi-node data processing system by sharing dynamic compiled (SQL) executable data processing statements between nodes of said data processing system comprising the steps of:

identifying each compiled SQL statement with a numerical identifier;
at a node receiving statements (a receiving node) storing a list of statements received at said receiving node listing the originating node and identifier for each of said received statements;
upon receiving a request for processing with a specified statement having said receiving node check its list of statements received for the specified statement by its originating node and identifier;

comparing the identification of said specified statement with said statements in said list of said receiving node, and if a match if found then accessing said statement stored at said receiving node;

if a match is not found, having said receiving node request the specified statement from another node, and when it is received then loading it into its local cache;

having said receiving node update its list of statements; and executing said statement at said receiving node.

26. A computer program product comprising computer readable storage for storing statements or instructions for use in executing on in a computer a method for updating entries in a cache a method of updating entries in said cache at one or more nodes in a database management system having a plurality of interconnected notes when object definition entries in a catalogue are changed, each of said nodes having an unique identification, said nodes being capable of storing or processing information, one of said nodes comprising a catalogue node having metadata describing tables and other SQL objects and relationships between them in the data processing system;

each node having a cache, said cache having a statement portion and a dependency portion;

said statement portion of said cache at each node for storing SQL statements, executables associated with said SQL statements, and environments with which said executables are associated, wherein said executables are each identified by an unique entry identification;

said dependency portion for storing object entries for said SQL objects including:

identification of the object which corresponds to the object name and object type;

a list of entries referring to executable entries in the statement portion of the cache whose execution relies on the definition and existence of said object; comprising the steps of:

updating said catalogue node by removing all invalid entries and broadcasting instructions to other known nodes of system to remove invalid entries from their respective caches, by:

making a first broadcast of instructions to said nodes to secure object entries in the dependency portion of each cache by first:

finding an object entry associated with the object that is being changed in the dependency portion of the cache;

if such an object entry in the dependency portion of the cache is not found, inserting a new object entry;

securing said object entry in the dependency portion of caches of said other nodes;

marking all the executables currently listed as being associated with the said object as invalid;

reporting to said database management system at the catalog node that the object entry in each of said caches have been marked as secured;

examining any executable newly arriving in a cache of a node and determining if it depends on an object that has been secured, and if so, marking it as invalid;

making a second broadcast from the catalog node to all known nodes to:

mark all entries in said caches which are dependent on a secured object or an invalid object as being invalid; and, removing the secured marking of all secured objects;

removing all invalid entries and objects.

27. The method of claim 26, further comprising the step of updating entries in said cache at each node when a node is added to said database, said updating step further comprising the steps of:

when a new node is added to the database system, sending from said catalogue node a list of all secured objects to said new node;

at said new node, for all the objects in the list of said objects secured at the catalog node, creating and securing a new object entry in the dependency portion of the cache of said new node;

at said new node, examining any executable newly arriving in the cache of said new node and determining if said executable depends on an object that has been secured, and if so, marking it as invalid.

* * * * *